US010390355B2

(12) United States Patent
Guo et al.

(10) Patent No.: US 10,390,355 B2
(45) Date of Patent: Aug. 20, 2019

(54) METHOD FOR SENDING UPLINK MULTI-USER TRANSMISSION TRIGGER FRAME, ACCESS POINT, AND STATION

(71) Applicant: Huawei Technologies Co., Ltd., Shenzhen, Guangdong (CN)

(72) Inventors: Yuchen Guo, Shenzhen (CN); Meilu Lin, Shenzhen (CN); Xun Yang, Shenzhen (CN); Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 15/713,247

(22) Filed: Sep. 22, 2017

(65) Prior Publication Data

US 2018/0014316 A1  Jan. 11, 2018

Related U.S. Application Data

(63) Continuation of application No. PCT/CN2015/076889, filed on Apr. 17, 2015.

(30) Foreign Application Priority Data

Mar. 24, 2015  (WO) ............... PCT/CN2015/074951

(51) Int. Cl.
*H04W 72/12* (2009.01)
*H04W 52/02* (2009.01)
(Continued)

(52) U.S. Cl.
CPC ..... *H04W 72/121* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS

2004/0190467 A1  9/2004  Liu et al.
2007/0230418 A1  10/2007  Takeuchi et al.
(Continued)

FOREIGN PATENT DOCUMENTS

CN  103228029 A  7/2013
CN  103857043 A  6/2014
(Continued)

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput", IEEE Std 802.11n™-2009, Sep. 2009, 536 pages.
(Continued)

*Primary Examiner* — Rebecca E Song

(57) ABSTRACT

An access point generates a beacon frame that carries a trigger frame information element comprising sending information of a trigger frame for indicating a sending period of the trigger frame; and sends the beacon frame. In this case, the station switches to an active state, and receives the trigger frame by listening to the channel, and the station performs uplink transmission according to indication of the trigger frame after receiving the trigger frame. In this way, when signaling overheads are not increased and reliability is ensured, a station can learn of a sending time of a trigger frame, and the station remains in a receiving state in an appropriate period of time.

14 Claims, 20 Drawing Sheets

(51) Int. Cl.
*H04W 74/06* (2009.01)
*H04W 72/04* (2009.01)
*H04W 74/08* (2009.01)

(52) U.S. Cl.
CPC ....... *H04W 72/1289* (2013.01); *H04W 74/06* (2013.01); *H04W 72/0446* (2013.01); *H04W 74/08* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/14* (2018.01); *Y02D 70/142* (2018.01); *Y02D 70/146* (2018.01); *Y02D 70/20* (2018.01); *Y02D 70/26* (2018.01)

(56) References Cited

U.S. PATENT DOCUMENTS

| | | | |
|---|---|---|---|
| 2013/0215879 A1 | 8/2013 | Rittner et al. | |
| 2013/0301502 A1* | 11/2013 | Kwon | H04W 52/0206 370/311 |
| 2014/0112229 A1 | 4/2014 | Merlin et al. | |
| 2015/0009879 A1 | 1/2015 | Kim et al. | |
| 2015/0063111 A1 | 3/2015 | Merlin et al. | |
| 2015/0131547 A1 | 5/2015 | Seok | |
| 2015/0139207 A1 | 5/2015 | Seok | |
| 2015/0341961 A1 | 11/2015 | Kim et al. | |
| 2016/0029357 A1 | 1/2016 | Lv et al. | |
| 2016/0044693 A1 | 2/2016 | Sun et al. | |
| 2016/0143006 A1* | 5/2016 | Ghosh | H04W 74/004 370/329 |
| 2016/0198500 A1* | 7/2016 | Merlin | H04W 74/08 370/329 |
| 2017/0055287 A1 | 2/2017 | Yang et al. | |
| 2018/0049240 A1* | 2/2018 | Kim | H04W 74/08 |

FOREIGN PATENT DOCUMENTS

| | | |
|---|---|---|
| CN | 104039013 A | 9/2014 |
| CN | 104039016 A | 9/2014 |
| CN | 104202822 A | 12/2014 |
| CN | 104206001 A | 12/2014 |
| CN | 104322110 A | 1/2015 |
| EP | 3190853 A1 | 7/2017 |
| WO | 2013122424 A1 | 8/2013 |
| WO | 2013162338 A1 | 10/2013 |
| WO | 2013162340 A1 | 10/2013 |
| WO | 2014/107031 A1 | 7/2014 |
| WO | 2016/123403 A1 | 8/2016 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz", IEEE Computer Society LAN/MAN Standards Committee, IEEE Std 802.11ac™-2013, Dec. 2013, 425 pages.

* cited by examiner

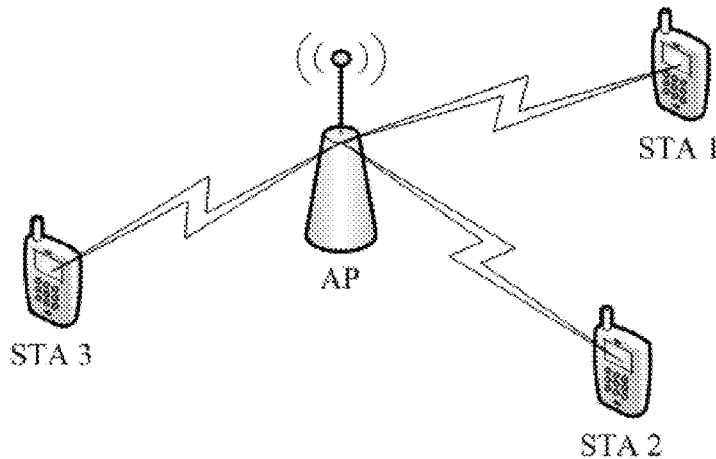

FIG. 1

```
┌─────────────────────────────────────────────┐
│ An AP sends, to a STA, a beacon frame that  │
│ carries a trigger frame information element,│       Step
│ where the trigger frame information element │       101
│ includes sending information of a           │
│ trigger frame, and the sending information  │
│ of the trigger frame is used by the STA to  │
│ obtain a sending period of the trigger frame│
└─────────────────────────────────────────────┘
                      ▼
┌─────────────────────────────────────────────┐
│ The AP obtains a target transmission time   │       Step
│ sequence of the trigger frame according to  │       102
│ the sending period of the trigger frame     │
└─────────────────────────────────────────────┘
                      ▼
┌─────────────────────────────────────────────┐
│ The AP contends for a channel when a target │       Step
│ transmission time of the trigger frame      │       103
│ arrives                                     │
└─────────────────────────────────────────────┘
                      ▼
┌─────────────────────────────────────────────┐
│ The AP sends the trigger frame to the STA   │
│ after the contention succeeds, where the    │       Step
│ target transmission time is any time point  │       104
│ in the target transmission time sequence    │
└─────────────────────────────────────────────┘
```

FIG. 2

AID: 1 2 3 ... ... ... 2007
TIM: | 1 | 1 | 0 | 0 | 0 | 1 | 0 | 0 | 0 | 1 | 1 | 0 | 0 | 1 | 0 | 1 | 0 | 0 | 0 | 0 | 0 | 1 | 0 | 0 | 1 |

AID:    1 2 3    ...    ...    ...    2007
TIM:    1 1 0 0 0 1 0 0 0 1 1 0 0 1 0 1 0 0 0 0 0 1 0 0 1
Sub-identifier  0 1     2     3 4    5 6         7     8
FIG. 21
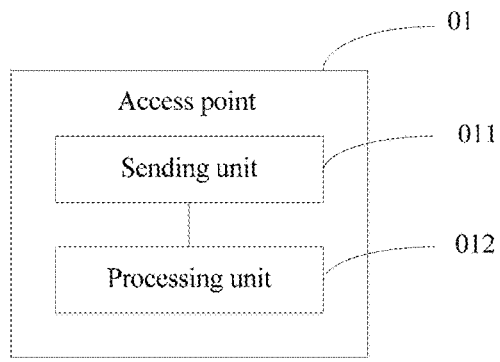
FIG. 22
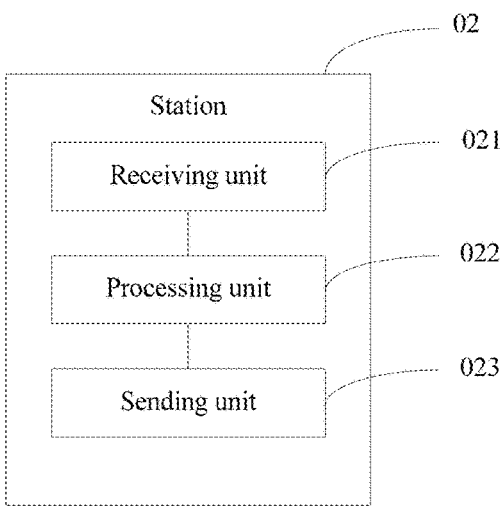
FIG. 23

| AID | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| TIM | 1 | 0 | 1 | 0 | 1 | 1 | 0 | 1 | 0 | 1 | 1 | 1 | 0 | 1 | 0 | 1 |
| Group identifier | 0 | | 0 | | 0 | 0 | | 1 | | 1 | 1 | 1 | | 2 | | 2 |

METHOD FOR SENDING UPLINK MULTI-USER TRANSMISSION TRIGGER FRAME, ACCESS POINT, AND STATION

CROSS-REFERENCE TO RELATED APPLICATIONS

This application is a continuation of International Application No. PCT/CN2015/076889, filed on Apr. 17, 2015, which claims priority to International Patent Application No. PCT/CN2015/074951, filed on Mar. 24, 2015. The disclosures of the aforementioned applications are hereby incorporated by reference in their entireties.

TECHNICAL FIELD

Embodiments of the present application relate to the field of communications technologies, and in particular, to a method for sending an uplink multi-user transmission trigger frame, an access point, and a station.

BACKGROUND

Orthogonal frequency division multiplexing (OFDM) is a basic transmission mode in current wireless communication, and is widely applied to wireless communications systems such as Long Term Evolution (LTE), Worldwide Interoperability for Microwave Access (WiMAX), and Wireless Fidelity (WiFi). In addition, the OFDM is further applied to fixed network transmission, for example, transmission modes such as an optical fiber, a copper twisted wire, and a cable. A basic principle of the OFDM is: when it is ensured that subcarriers are orthogonal, a spacing between the subcarriers is compressed to the smallest. In this way, it can be ensured that multiple parallel paths that do not interfere with each other are formed, and in addition, frequency usage efficiency of a system is improved. Because the OFDM has the foregoing features, if OFDM subcarriers that do not interfere with each other are allocated to multiple users, the OFDM can be used to implement multi-user access or multi-user data transmission. It can be learned that OFDMA may be used to implement parallel multi-user data transmission, and data transmission concurrency is improved.

In addition, a multiple-input multiple-output (MIMO) technology can provide transmit (receive) beamforming, so as to effectively improve transmit (receive) power, and effectively improve reliability of a communications system. Furthermore, the MIMO technology can generate additional spatial freedom, so as to improve a throughput of the system many fold, and effectively improve a rate of the communications system. Because of these advantages of the MIMO technology, the MIMO technology has become one of critical technologies in the 802.11n standard protocol and the 802.11ac standard protocol. In addition, because a beamforming technology is used, a transmit end may send data to multiple users by using multiple spatial flows, or may receive data sent by multiple users in different spatial flows, so as to implement parallel multi-user data transmission and improve data transmission concurrency.

Currently, an orthogonal frequency division multiple access (OFDMA) mode, a multi-user MIMO (MU-MIMO) mode, or an OFDMA and MU-MIMO hybrid transmission mode is commonly used in uplink multi-user transmission. A station (STA) needs to learn of a transmission configuration and a parameter of the station by using an access point (AP), for example, a specific used spectrum resource block, a quantity of used spatial flows, a used modulation and coding scheme, and time synchronization information. Therefore, a manner in which the access point triggers the station to perform uplink multi-user transmission draws extensive attention. However, for uplink multi-user transmission triggered by the access point, if the station does not know a time at which the access point sends a trigger frame, the station needs to keep listening to a channel so as to receive the trigger frame to perform uplink transmission. This is inconvenient for power saving of the station.

In the prior art, an access point may periodically broadcast a trigger frame scheduling information element by using a beacon frame, and the trigger frame scheduling information element carries a sending time of a first trigger frame and a quantity of trigger frames that are to be sent after this beacon frame. Further, when sending a trigger frame, the access point may add a sending interval between a sending time of the trigger frame and a sending time of a next trigger frame to the trigger frame, that is, after the sending interval, the access point sends a trigger frame again.

However, if the access point adds a sending interval between a sending time of the trigger frame and a sending time of a next trigger frame to each trigger frame, because triggering signaling of the trigger frame is in a physical layer preamble of the trigger frame, and this part of signaling resources are relatively precious, relatively large signaling overheads are caused. If the station does not successfully receive a trigger frame, the station cannot obtain a sending time of a next trigger frame. Consequently, reliability is relatively poor. Therefore, the present disclosure is to achieve a technical effect that when signaling overheads are not increased and reliability is ensured, a station learns of a sending time of a trigger frame, and the station remains in a receiving state in an appropriate period of time.

SUMMARY

Embodiments of the present disclosure provide a method for sending an uplink multi-user transmission trigger frame, an access point, and a station, so that when signaling overheads are not increased and reliability is ensured, a station can learn of a sending time of a trigger frame, and the station remains in a receiving state in an appropriate period of time.

According to a first aspect, a method for sending an uplink multi-user transmission trigger frame is provided, where the method includes:

sending, by an access point to a station, a beacon frame that carries a trigger frame information element, where the trigger frame information element includes sending information of a trigger frame, and the sending information of the trigger frame is used by the station to obtain a sending period of the trigger frame;

obtaining, by the access point, a target transmission time sequence of the trigger frame according to the sending period of the trigger frame;

contending, by the access point, for a channel when a target transmission time of the trigger frame arrives; and sending, by the access point, the trigger frame to the station after the contention succeeds, where the target transmission time is any time point in the target transmission time sequence.

With reference to the first aspect, in a first possible implementation manner, the sending information of the trigger frame is the sending period of the trigger frame or a quantity of sent trigger frames.

With reference to the first aspect or the first possible implementation manner of the first aspect, in a second possible implementation manner, the trigger frame information element further includes a sending time of a first trigger frame; and the obtaining, by the access point, a target transmission time sequence of the trigger frame according to the sending period of the trigger frame includes:

obtaining, by the access point, the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

With reference to the first aspect or the first possible implementation manner of the first aspect, in a third possible implementation manner, the trigger frame information element further includes a trigger frame send window size, and the trigger frame send window size is used to indicate an adjustment range of a sending time of the trigger frame; and the obtaining, by the access point, a target transmission time sequence of the trigger frame according to the sending period of the trigger frame includes:

obtaining, by the access point, the target transmission time sequence of the trigger frame according to the trigger frame send window size and the sending period of the trigger frame, where the target transmission time sequence includes:

$t_0+A_0, t_1+A_1, \ldots, t_n+A_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}$, $-U < A_i < U$, and U is the trigger frame send window size.

With reference to the first aspect or any one of the foregoing possible implementation manners of the first aspect, in a fourth possible implementation manner, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

With reference to the first aspect or any one of the foregoing possible implementation manners of the first aspect, in a fifth possible implementation manner, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

According to a second aspect, a method for sending an uplink multi-user transmission trigger frame is provided, where the method includes:

receiving, by a station from an access point, a beacon frame that carries a trigger frame information element, where the trigger frame information element includes sending information of a trigger frame;

obtaining, by the station, a sending period of the trigger frame according to the sending information of the trigger frame;

obtaining, by the station, a target transmission time sequence of the trigger frame according to the sending period of the trigger frame;

switching, by the station, to an active state when a target transmission time of the trigger frame arrives;

receiving, by the station, the trigger frame by listening to a channel, where the target transmission time is any time point in the target transmission time sequence; and performing, by the station, uplink transmission according to indication of the trigger frame.

With reference to the second aspect, in a first possible implementation manner, the sending information of the trigger frame is the sending period of the trigger frame or a quantity of sent trigger frames.

With reference to the second aspect or the first possible implementation manner of the second aspect, in a second possible implementation manner, the trigger frame information element further includes a sending time of a first trigger frame; and the obtaining, by the station, a target transmission time sequence of the trigger frame according to the sending period of the trigger frame includes:

obtaining, by the station, the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

With reference to the second aspect or the first possible implementation manner of the second aspect, in a third possible implementation manner, the trigger frame information element further includes a trigger frame send window size, and the trigger frame send window size is used to indicate an adjustment range of a sending time of the trigger frame; and the obtaining, by the station, a target transmission time sequence of the trigger frame according to the sending period of the trigger frame includes:

obtaining, by the station, the target transmission time sequence of the trigger frame according to the trigger frame send window size and the sending period of the trigger frame, where the target transmission time sequence includes:

$t_0-U, t_1-U, \ldots, t_n-U$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, and U is the trigger frame send window size.

With reference to the second aspect or any one of the foregoing possible implementation manners of the second aspect, in a fourth possible implementation manner, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

With reference to the second aspect or any one of the foregoing possible implementation manners of the second aspect, in a fifth possible implementation manner, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

According to a third aspect, a method for sending an uplink multi-user transmission trigger frame is provided, where the method includes:

contending, by an access point, for a channel; and sending, by the access point, a trigger frame to a station after the contention succeeds, where the trigger frame carries indication information, and the indication information is used to indicate that when a preset condition is met, the access point delivers another trigger frame to the station in a preset period of time since the station completes uplink transmission.

With reference to the third aspect, in a first possible implementation manner, the preset condition includes:

after the station completes uplink transmission, there is another station that needs to be triggered by the access point to perform uplink transmission, or after the station completes uplink transmission, there is another station that has not completed uplink transmission.

According to a fourth aspect, a method for sending an uplink multi-user transmission trigger frame is provided, where the method includes:

receiving, by a station by listening to a channel, a trigger frame sent by an access point, where the trigger frame carries indication information, and the indication information is used to indicate that when a preset condition is met, the access point delivers another trigger frame to the station in a preset period of time since the station completes uplink transmission;

performing, by the station, uplink transmission according to indication of the trigger frame; and remaining, by the station, in an active state after completing uplink transmission according to indication of the indication information, and receiving the another trigger frame by listening to the channel.

With reference to the fourth aspect, in a first possible implementation manner, the preset condition includes:

after the station completes uplink transmission, there is another station that needs to be triggered by the access point to perform uplink transmission, or after the station completes uplink transmission, there is another station that has not completed uplink transmission.

According to a fifth aspect, a method for sending an uplink multi-user transmission trigger frame is provided, where the method includes:

receiving, by an access point, a resource allocation request sent by a station, where the resource allocation request includes uplink transmission requirement information of the station;

sending, by the access point to the station, a response frame that carries indication information, where the indication information is used to indicate whether the access point delivers a trigger frame to the station in a preset period of time; and delivering, by the access point, the trigger frame to the station in the preset period of time.

With reference to the fifth aspect, in a first possible implementation manner, the uplink transmission requirement information includes a data amount, a data type, and a service priority of uplink transmission of the station.

According to a sixth aspect, a method for sending an uplink multi-user transmission trigger frame is provided, where the method includes:

sending, by a station, a resource allocation request to an access point, where the resource allocation request includes uplink transmission requirement information of the station;

receiving, by the station from the access point, a response frame that carries indication information and that is sent to the station, where the indication information is used to indicate whether the access point delivers a trigger frame to the station in a preset period of time; and switching, by the station, to an active state if the indication information indicates that the access point delivers the trigger frame to the station in the preset period of time, and receiving the trigger frame by listening to a channel.

With reference to the sixth aspect, in a first possible implementation manner, the uplink transmission requirement information includes a data amount, a data type, and a service priority of uplink transmission of the station.

According to a seventh aspect, a method for sending an uplink multi-user transmission trigger frame is provided, where the method includes:

sending, by an access point to a station, a beacon frame that carries service identifier mapping information, where the service identifier mapping information is used to indicate whether the station has to-be-receiving downlink data;

sending, by the access point, a trigger frame to stations that have to-be-receiving downlink data and that are in a sleep state;

receiving, by the access point, feedback information from at least one station in the stations that have to-be-receiving downlink data and that are in a sleep state, where the feedback information is used to indicate that the at least one station is in an active state; and if the trigger frame sent by the access point fails to trigger all stations in the stations that have to-be-receiving downlink data and that are in a sleep state, sending, by the access point, a trigger frame again to another untriggered station that has to-be-receiving downlink data and that is in a sleep state, until all the stations in the stations that have to-be-receiving downlink data and that are in a sleep state are triggered.

With reference to the seventh aspect, in a first possible implementation manner, the beacon frame further includes indication information, and the indication information includes a bitmap or offset information.

With reference to the first possible implementation manner of the seventh aspect, in a second possible implementation manner, if the indication information is the bitmap, before the sending, by an access point to a station, a beacon frame that carries service identifier mapping information, the method further includes:

determining, by the access point from the stations that have to-be-receiving downlink data and that are in a sleep state, a station that is to be triggered and a station that is not to be triggered; and generating, by the access point, the bitmap according to the station that is to be triggered and the station that is not to be triggered, where each bit in the bitmap is corresponding to one station in the stations that have to-be-receiving downlink data and that are in a sleep state, and is used to indicate whether the station is to be triggered.

With reference to the first possible implementation manner of the seventh aspect, in a third possible implementation manner, if the indication information is the offset information, before the sending, by an access point to a station, a beacon frame that carries service identifier mapping information, the method further includes:

determining, by the access point from the stations that have to-be-receiving downlink data and that are in a sleep state, a station that is to be triggered and a station that is not to be triggered; and generating, by the access point, the offset information according to the station that is to be triggered and the station that is not to be triggered, where the offset information includes a sub-identifier of a start station and an offset.

With reference to the seventh aspect or any one of the foregoing possible implementation manners of the seventh aspect, in a fourth possible implementation manner, the feedback information includes a PS-Poll frame, buffer information, or uplink data.

According to an eighth aspect, a method for sending an uplink multi-user transmission trigger frame is provided, where the method includes:

receiving, by a station from an access point, a beacon frame that carries service identifier mapping information, where the service identifier mapping information is used to indicate whether the station has to-be-receiving downlink data;

switching, by the station, to an active state if the service identifier mapping information indicates that the station has to-be-receiving downlink data;

receiving, by the station by listening to a channel, a trigger frame sent by the access point; and sending, by the station, feedback information to the access point, where the feedback information is used to indicate that the station is in an active state.

With reference to the eighth aspect, in a first possible implementation manner, the beacon frame further includes indication information, and the indication information includes a bitmap or offset information.

With reference to the first possible implementation manner of the eighth aspect, in a second possible implementation manner, if the indication information is the bitmap, the switching, by the station, to an active state if the service identifier mapping information indicates that the station has to-be-receiving downlink data includes:

determining, by the station according to the service identifier mapping information, whether the station has to-be-receiving downlink data;

if the station has to-be-receiving downlink data, determining, by the station according to a bit that is in the bitmap and that is corresponding to the station, whether the station is to be triggered, where each bit in the bitmap is corresponding to one station in the stations that have to-be-receiving downlink data and that are in a sleep state, and is used to indicate whether the station is to be triggered; and switching, by the station, to an active state if the station is to be triggered.

With reference to the first possible implementation manner of the eighth aspect, in a third possible implementation manner, if the indication information is the offset information, the offset information includes a sub-identifier of a start station and an offset, and the switching, by the station, to an active state if the service identifier mapping information indicates that the station has to-be-receiving downlink data includes:

determining, by the station according to the service identifier mapping information, whether the station has to-be-receiving downlink data;

if the station has to-be-receiving downlink data, obtaining, by the station, a sub-identifier of the station according to the service identifier mapping information;

determining, by the station according to the sub-identifier of the start station and the offset, an identifier range of a station that is to be triggered;

determining, by the station, whether the sub-identifier of the station falls within the identifier range; and switching, by the station, to an active state if the sub-identifier of the station falls within the identifier range.

With reference to the eighth aspect or any one of the foregoing possible implementation manners of the eighth aspect, in a fourth possible implementation manner, the feedback information includes a PS-Poll frame, buffer information, or uplink data.

According to a ninth aspect, an access point is provided, and the access point includes a transceiver and a processor, where the transceiver is configured to send, to a station, a beacon frame that carries a trigger frame information element, where the trigger frame information element includes sending information of a trigger frame, and the sending information of the trigger frame is used by the station to obtain a sending period of the trigger frame;

the processor is configured to obtain a target transmission time sequence of the trigger frame according to the sending period of the trigger frame;

the processor is further configured to contend for a channel when a target transmission time of the trigger frame arrives; and the transceiver is further configured to send the trigger frame to the station after the contention succeeds, where the target transmission time is any time point in the target transmission time sequence.

With reference to the ninth aspect, in a first possible implementation manner, the sending information of the trigger frame is the sending period of the trigger frame or a quantity of sent trigger frames.

With reference to the ninth aspect or the first possible implementation manner of the ninth aspect, in a second possible implementation manner, the trigger frame information element further includes a sending time of a first trigger frame; and the processor is specifically configured to:

obtain the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}, t_i - t_{i-1} = t_j - t_{j-1} = T$, T is equal to the sending period of the trigger frame, and $t_0$ is equal to the sending time of the first trigger frame.

With reference to the ninth aspect or the first possible implementation manner of the ninth aspect, in a third possible implementation manner, the trigger frame information element further includes a trigger frame send window size, and the trigger frame send window size is used to indicate an adjustment range of a sending time of the trigger frame; and the processor is specifically configured to:

obtain the target transmission time sequence of the trigger frame according to the trigger frame send window size and the sending period of the trigger frame, where the target transmission time sequence includes:

$t_0+A_0, t_1+A_1, \ldots, t_n+A_n$, where $t_0, t_1, \ldots, t_n$ meet $\forall i, j \in \{1, 2, \ldots, n\}, t_i - t_{i-1} = t_j - t_{j-1} = T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}, -U < A_i < U$, and U is the trigger frame send window size.

With reference to the ninth aspect or any one of the foregoing possible implementation manners of the ninth aspect, in a fourth possible implementation manner, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

With reference to the ninth aspect or any one of the foregoing possible implementation manners of the ninth aspect, in a fifth possible implementation manner, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

According to a tenth aspect, a station is provided, and the station includes a transceiver and a processor, where the transceiver is configured to receive, from an access point, a beacon frame that carries a trigger frame information element, where the trigger frame information element includes sending information of a trigger frame;

the processor is configured to obtain a sending period of the trigger frame according to the sending information of the trigger frame;

the processor is further configured to obtain a target transmission time sequence of the trigger frame according to the sending period of the trigger frame;

the processor is further configured to switch to an active state when a target transmission time of the trigger frame arrives;

the transceiver is further configured to receive the trigger frame by listening to a channel, where the target transmission time is any time point in the target transmission time sequence; and the transceiver is further configured to perform uplink transmission according to indication of the trigger frame.

With reference to the tenth aspect, in a first possible implementation manner, the sending information of the trigger frame is the sending period of the trigger frame or a quantity of sent trigger frames.

With reference to the tenth aspect or the first possible implementation manner of the tenth aspect, in a second possible implementation manner, the trigger frame information element further includes a sending time of a first trigger frame; and the processor is specifically configured to:

obtain the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$ $t_1-t_{i-1}=t_j-t_{j-1}=T$, T is equal to the sending period of the trigger frame, and $t_0$ is equal to the sending time of the first trigger frame.

With reference to the tenth aspect or the first possible implementation manner of the tenth aspect, in a third possible implementation manner, the trigger frame information element further includes a trigger frame send window size, and the trigger frame send window size is used to indicate an adjustment range of a sending time of the trigger frame; and the processor is specifically configured to:

obtain the target transmission time sequence of the trigger frame according to the trigger frame send window size and the sending period of the trigger frame, where the target transmission time sequence includes:

$t_0-U, t_1-U, \ldots, t_n-U$, where $t_0, t_1, \ldots, t_n$ meet $\forall i, j \in \{1, 2, \ldots, n\}$, $t_i-t_{i-1}=t_j-t_{j-1}=T$, T is equal to the sending period of the trigger frame, $t_0, t_1, \ldots, t_n$ are a periodic sequence whose period is T, and U is the trigger frame send window size.

With reference to the tenth aspect or any one of the foregoing possible implementation manners of the tenth aspect, in a fourth possible implementation manner, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

With reference to the tenth aspect or any one of the foregoing possible implementation manners of the tenth aspect, in a fifth possible implementation manner, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

According to an eleventh aspect, an access point is provided, and the access point includes a transceiver and a processor, where the processor is configured to contend for a channel; and the transceiver is further configured to send the trigger frame to a station after the contention succeeds, where the trigger frame carries indication information, and the indication information is used to indicate that when a preset condition is met, the access point delivers another trigger frame to the station in a preset period of time since the station completes uplink transmission.

With reference to the eleventh aspect, in a first possible implementation manner, the preset condition includes:

after the station completes uplink transmission, there is another station that needs to be triggered by the access point to perform uplink transmission, or after the station completes uplink transmission, there is another station that has not completed uplink transmission.

According to a twelfth aspect, a station is provided, and the station includes a transceiver and a processor, where the transceiver is configured to receive, by listening to a channel, a trigger frame sent by an access point, where the trigger frame carries indication information, and the indication information is used to indicate that when a preset condition is met, the access point delivers another trigger frame to the station in a preset period of time since the station completes uplink transmission;

the transceiver is further configured to perform uplink transmission according to indication of the trigger frame;

the processor is configured to remain in an active state after uplink transmission is completed according to indication of the indication information; and the transceiver is further configured to receive the another trigger frame by listening to the channel.

With reference to the twelfth aspect, in a first possible implementation manner, the preset condition includes:

after the station completes uplink transmission, there is another station that needs to be triggered by the access point to perform uplink transmission, or after the station completes uplink transmission, there is another station that has not completed uplink transmission.

According to a thirteenth aspect, an access point is provided, and the access point includes a transceiver and a processor, where the transceiver is configured to receive a resource allocation request sent by a station, where the resource allocation request includes uplink transmission requirement information of the station;

the transceiver is further configured to send, to the station, a response frame that carries indication information, where the indication information is used to indicate whether the access point delivers a trigger frame to the station in a preset period of time; and the transceiver is further configured to deliver the trigger frame to the station in the preset period of time.

With reference to the thirteenth aspect, in a first possible implementation manner, the uplink transmission requirement information includes a data amount, a data type, and a service priority of uplink transmission of the station.

According to a fourteenth aspect, a station is provided, and the station includes a transceiver and a processor, where the transceiver is configured to send a resource allocation request to an access point, where the resource allocation request includes uplink transmission requirement information of the station;

the transceiver is further configured to receive, from the access point, a response frame that carries indication information and that is sent to the station, where the indication information is used to indicate whether the access point delivers a trigger frame to the station in a preset period of time;

the processor is configured to switch to an active state when the indication information indicates that the access point delivers the trigger frame to the station in the preset period of time; and the transceiver is further configured to receive the trigger frame by listening to a channel.

With reference to the fourteenth aspect, in a first possible implementation manner, the uplink transmission requirement information includes a data amount, a data type, and a service priority of uplink transmission of the station.

According to a fifteenth aspect, an access point is provided, and the access point includes a transceiver and a processor, where the transceiver is configured to send a beacon frame to a station, where the beacon frame includes service identifier mapping information, and the service identifier mapping information is used to indicate whether the station has to-be-receiving downlink data;

the transceiver is further configured to send a trigger frame to stations that have to-be-receiving downlink data and that are in a sleep state;

the transceiver is further configured to receive feedback information from at least one station in the stations that have to-be-receiving downlink data and that are in a sleep state, where the feedback information is used to indicate that the at least one station is in an active state; and the transceiver is further configured to: if the trigger frame sent by the access point fails to trigger all stations in the stations that have to-be-receiving downlink data and that are in a sleep state, send, a trigger frame again to a station that has to-be-receiving downlink data and that is in a sleep state, until all the stations in the stations that have to-be-receiving downlink data and that are in a sleep state are triggered.

With reference to the fifteenth aspect, in a first possible implementation manner, the beacon frame further includes indication information, and the indication information includes a bitmap or offset information.

With reference to the first possible implementation manner of the fifteenth aspect, in a second possible implementation manner, if the indication information is the bitmap, the processor is further configured to:

before the beacon frame is sent to the station, determine, from the stations that have to-be-receiving downlink data and that are in a sleep state, a station that is to be triggered and a station that is not to be triggered; and generate the bitmap according to the station that is to be triggered and the station that is not to be triggered, where each bit in the bitmap is corresponding to one station in the stations that have to-be-receiving downlink data and that are in a sleep state, and is used to indicate whether the station is to be triggered.

With reference to the first possible implementation manner of the fifteenth aspect, in a third possible implementation manner, if the indication information is the offset information, the processor is further configured to:

before the beacon frame is sent to the station, determine, from the stations that have to-be-receiving downlink data and that are in a sleep state, a station that is to be triggered and a station that is not to be triggered; and generate the offset information according to the station that is to be triggered and the station that is not to be triggered, where the offset information includes a sub-identifier of a start station and an offset.

With reference to the fifteenth aspect or any one of the foregoing possible implementation manners of the fifteenth aspect, in a fourth possible implementation manner, the feedback information includes a PS-Poll frame, buffer information, or uplink data.

According to a sixteenth aspect, a station is provided, and the station includes a transceiver and a processor, where the transceiver is configured to receive, from an access point, a beacon frame that carries service identifier mapping information, where the service identifier mapping information is used to indicate whether the station has to-be-receiving downlink data;

the processor is configured to switch, to an active state if the service identifier mapping information indicates that the station has to-be-receiving downlink data;

the transceiver is further configured to receive, by listening to a channel, a trigger frame sent by the access point; and the transceiver is further configured to send feedback information to the access point, where the feedback information is used to indicate that the station is in an active state.

With reference to the sixteenth aspect, in a first possible implementation manner, the beacon frame further includes indication information, and the indication information includes a bitmap or offset information.

With reference to the first possible implementation manner of the sixteenth aspect, in a second possible implementation manner, if the indication information is the bitmap, the processor is specifically configured to:

determine, according to the service identifier mapping information, whether the station has to-be-receiving downlink data;

if the station has to-be-receiving downlink data, determine, according to a bit that is in the bitmap and that is corresponding to the station, whether the station is to be triggered, where each bit in the bitmap is corresponding to one station in the stations that have to-be-receiving downlink data and that are in a sleep state, and is used to indicate whether the station is to be triggered; and switch to an active state if the station is to be triggered.

With reference to the first possible implementation manner of the sixteenth aspect, in a third possible implementation manner, if the indication information is the offset information, the offset information includes a sub-identifier of a start station and an offset, and the processor is specifically configured to:

determine, according to the service identifier mapping information, whether the station has to-be-receiving downlink data;

if the station has to-be-receiving downlink data, obtain a sub-identifier of the station according to the service identifier mapping information;

determine, according to the sub-identifier of the start station and the offset, an identifier range of a station that is to be triggered;

determine whether the sub-identifier of the station falls within the identifier range; and switch to an active state if the sub-identifier of the station falls within the identifier range.

With reference to the sixteenth aspect or any one of the foregoing possible implementation manners of the sixteenth aspect, in a fourth possible implementation manner, the feedback information includes a PS-Poll frame, buffer information, or uplink data.

The embodiments of the present disclosure provide a method for sending an uplink multi-user transmission trigger frame, an access point, and a station. An access point sends, to a station, a beacon frame that carries a trigger frame information element, the trigger frame information element includes sending information of a trigger frame, and the sending information may be a sending period of the trigger frame or a quantity of sent trigger frames. The station obtains a target transmission time sequence of the trigger frame according to the sending information after receiving the beacon frame. The access point contends for a channel when a target transmission time of the trigger frame arrives, and the access point sends the trigger frame to the station after the contention succeeds. In this case, the station switches to an active state, and receives the trigger frame by listening to the channel, and the station performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the station remains in a receiving state in an appropriate period of time.

The embodiments of the present disclosure provide another method for sending an uplink multi-user transmission trigger frame, an access point, and a station. The access point sends a trigger frame to a station after the contention succeeds, the trigger frame carries indication information, and the indication information is used to indicate that when a preset condition is met, the access point delivers another trigger frame to the station in a preset period of time since the station completes uplink transmission, so that another station that has not performed uplink transmission or another station that has not completed uplink transmission can complete uplink transmission.

The embodiments of the present disclosure provide another method for sending an uplink multi-user transmission trigger frame, an access point, and a station. A station first sends a resource allocation request to an access point before the access point sends a trigger frame, and the resource allocation request includes uplink transmission requirement information of the station. The access point sends, to the station according to the uplink transmission requirement information, a response frame that carries indication information, so as to indicate whether the access point delivers the trigger frame to the station in a preset period of time. Therefore, the station switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

The embodiments of the present disclosure further provide another method for sending an uplink multi-user transmission trigger frame, an access point, and a station. An access point sends, to a station, a beacon frame that carries service identifier mapping information, so as to indicate whether the station has to-be-receiving downlink data. The station switches to an active state if the service identifier mapping information indicates that the station has to-be-receiving downlink data, and receives, by listening to a channel, a trigger frame sent by the access point. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

FIG. 1 is a schematic diagram of an application scenario of a method for sending an uplink multi-user transmission trigger frame according to an embodiment of the present disclosure;

FIG. 2 is a first schematic flowchart of a method for sending an uplink multi-user transmission trigger frame according to an embodiment of the present disclosure;

FIG. 21 is a schematic diagram of a sub-identifier in a method for sending an uplink multi-user transmission trigger frame according to an embodiment of the present disclosure;

FIG. 22 is a schematic structural diagram of an access point according to an embodiment of the present disclosure;

FIG. 23 is a schematic structural diagram of a station according to an embodiment of the present disclosure;

DETAILED DESCRIPTION

Figure 3:
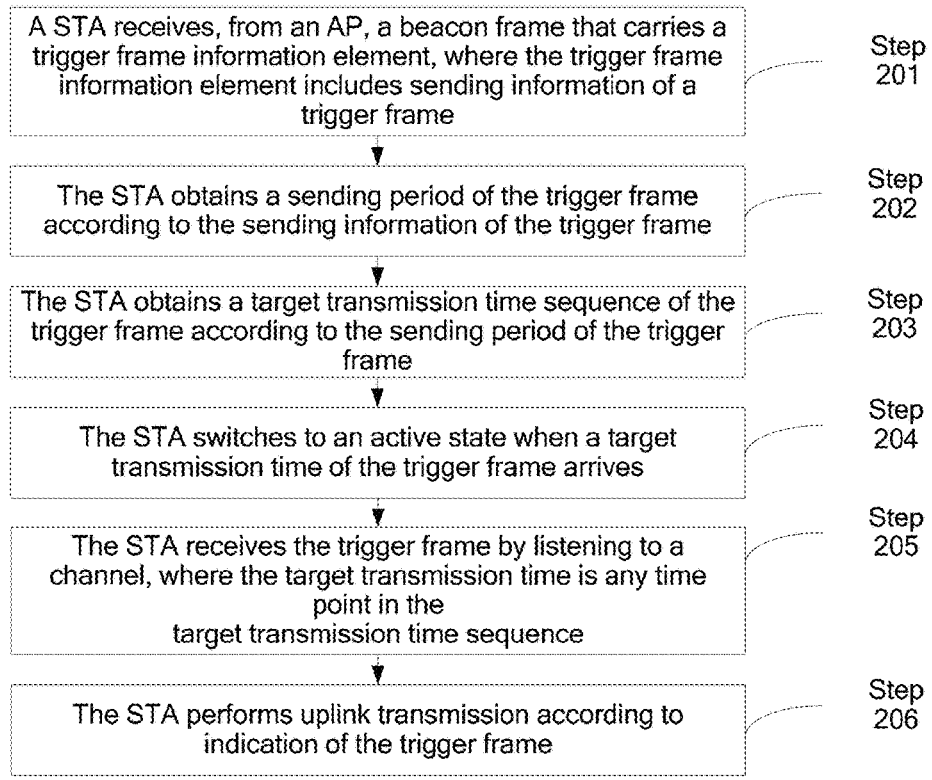
FIG. 3 is a second schematic flowchart of a method for sending an uplink multi-user transmission trigger frame according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure may be applied to a wireless local area network (WLAN), and the WLAN may include multiple basic service sets (BSS). A network node of a BSS is a station (STA), and the station includes an access point (AP) station and a non-access point station (Non-AP STA). Each BSS may include one AP and multiple non-AP STAs associated with the AP.

The AP is also referred to as a wireless access point, a hot spot, or the like. The AP is an access point used by a mobile user to access a wired network, and is mainly deployed inside a house, a building, and a campus. A typical coverage radius is tens of meters to hundreds of meters. Certainly, the AP may be deployed outdoors. The AP is equivalent to a bridge that connects a wired network and a wireless network. A main function of the AP is to connect all wireless network clients together, and then is to connect a wireless network to the Ethernet. Currently, a standard mainly used by the AP is an IEEE (Institute of Electrical and Electronics Engineers) 802.11 series. Specifically, the AP may be a terminal device or a network device with a WiFi chip. Optionally, the AP may be a device that supports an 802.11ax standard. Further, optionally, the AP may be a device that supports multiple WLAN standards, such as 802.11ac, 802.11n, 802.11g, 802.11b, and 802.11a.

The non-AP STA, hereinafter referred to as a STA, may be a wireless communications chip, a wireless sensor, or a wireless communications terminal, such as a mobile phone that supports a WiFi communications function, a tablet computer that supports a WiFi communications function, a set top box that supports a WiFi communications function, a smart television that supports a WiFi communications function, an intelligent wearable device that supports a WiFi communications function, or a computer that supports a WiFi communications function. Optionally, the STA may support an 802.11ax standard. Further, optionally, the STA may support multiple WLAN standards, such as 802.11ac, 802.11n, 802.11g, 802.11b, and 802.11a.

FIG. 1 is a schematic system diagram of a typical WLAN deployment scenario. One AP and three STAs are involved, and the AP separately communicates with a STA 1, a STA 2, and a STA 3. A mode of uplink transmission between the AP and the STA includes but is not limited to an OFDMA mode, a MU-MIMO mode, or an OFDMA and MU-MIMO hybrid transmission mode. The following describes in detail a method for sending an uplink multi-user transmission trigger frame provided in an embodiment of the present disclosure.

Embodiment 1

This embodiment of the present disclosure provides a method for sending an uplink multi-user transmission trigger frame, and the method is applied to an AP. As shown in FIG. 2, the method includes the following steps:

Step 101: An AP sends, to a STA, a beacon frame that carries a trigger frame information element, where the trigger frame information element includes sending information of a trigger frame, and the sending information of the trigger frame is used by the STA to obtain a sending period of the trigger frame.

Step 102: The AP obtains a target transmission time sequence of the trigger frame according to the sending period of the trigger frame.

Step 103: The AP contends for a channel when a target transmission time of the trigger frame arrives.

Step 104: The AP sends the trigger frame to the STA after the contention succeeds, where the target transmission time is any time point in the target transmission time sequence.

According to the method for sending an uplink multi-user transmission trigger frame provided in this embodiment of the present disclosure, an AP sends, to a STA, a beacon frame that carries a trigger frame information element, the trigger frame information element includes sending information of a trigger frame, and the sending information may be a sending period of the trigger frame or a quantity of sent trigger frames. The STA obtains a target transmission time sequence of the trigger frame according to the sending information after receiving the beacon frame. The AP contends for a channel when a target transmission time of the trigger frame arrives, and the AP sends the trigger frame to the STA after the contention succeeds. In this case, the STA switches to an active state, and receives the trigger frame by listening to the channel, and the STA performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 2

This embodiment of the present disclosure provides another method for sending an uplink multi-user transmission trigger frame, and the method is applied to a STA. As shown in FIG. 3, the method includes the following steps:

Step 201: A STA receives, from an AP, a beacon frame that carries a trigger frame information element, where the trigger frame information element includes sending information of a trigger frame.

Step 202: The STA obtains a sending period of the trigger frame according to the sending information of the trigger frame.

Step 203: The STA obtains a target transmission time sequence of the trigger frame according to the sending period of the trigger frame.

Step 204: The STA switches to an active state when a target transmission time of the trigger frame arrives.

Step 205: The STA receives the trigger frame by listening to a channel, where the target transmission time is any time point in the target transmission time sequence.

Step 206: The STA performs uplink transmission according to indication of the trigger frame.

According to the method for sending an uplink multi-user transmission trigger frame provided in this embodiment of the present disclosure, a STA receives, from an AP, a beacon frame that carries a trigger frame information element, the trigger frame information element includes sending information of a trigger frame, and the sending information may be a sending period of the trigger frame or a quantity of sent trigger frames. The STA obtains a target transmission time sequence of the trigger frame according to the sending information after receiving the beacon frame. The AP contends for a channel when a target transmission time of the trigger frame arrives, and the AP sends the trigger frame to the STA after the contention succeeds. In this case, the STA switches to an active state, and receives the trigger frame by listening to the channel, and the STA performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 3

Figure 4:
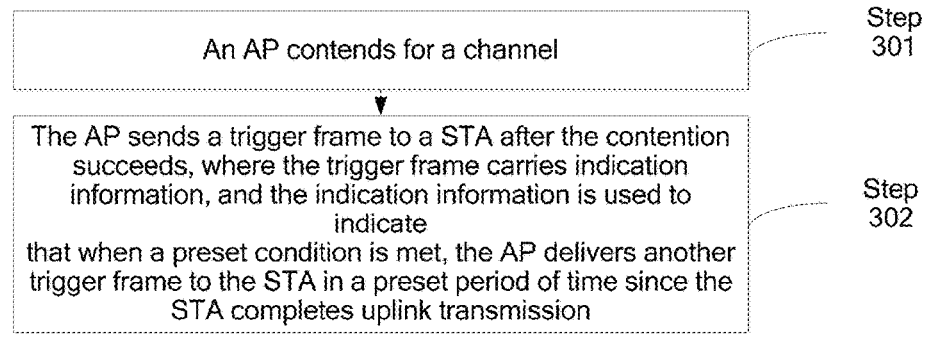
FIG. 4 is a third schematic flowchart of a method for sending an uplink multi-user transmission trigger frame according to an embodiment of the present disclosure.

This embodiment of the present disclosure provides another method for sending an uplink multi-user transmission trigger frame, and the method is applied to an AP. As shown in FIG. 4, the method includes the following steps:

Step 301: An AP contends for a channel.

Step 302: The AP sends the trigger frame to a STA after the contention succeeds, where the trigger frame carries indication information, and the indication information is used to indicate that when a preset condition is met, the AP delivers another trigger frame to the STA in a preset period of time since the STA completes uplink transmission.

According to the method for sending an uplink multi-user transmission trigger frame provided in this embodiment of the present disclosure, the AP sends a trigger frame to a STA after the contention succeeds, the trigger frame carries indication information, and the indication information is used to indicate that when a preset condition is met, the AP delivers another trigger frame to the STA in a preset period of time since the STA completes uplink transmission, so that another STA that has not performed uplink transmission or another STA that has not completed uplink transmission can complete uplink transmission.

Embodiment 4

Figure 5:
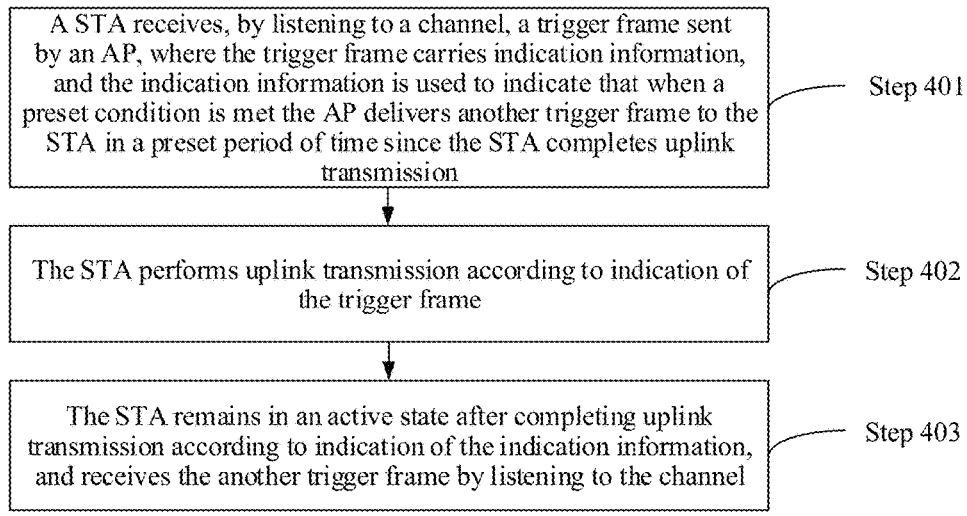
FIG. 5 is a fourth schematic flowchart of a method for sending an uplink multi-user transmission trigger frame according to an embodiment of the present disclosure.

This embodiment of the present disclosure provides a method for sending an uplink multi-user transmission trigger frame, and the method is applied to a STA. As shown in FIG. 5, the method includes the following steps:

Step 401: A STA receives, by listening to a channel, a trigger frame sent by an AP, where the trigger frame carries indication information, and the indication information is used to indicate that when a preset condition is met the AP delivers another trigger frame to the STA in a preset period of time since the STA completes uplink transmission.

Step 402: The STA performs uplink transmission according to indication of the trigger frame.

Step 403: The STA remains in an active state after completing uplink transmission according to indication of the indication information, and receives the other trigger frame by listening to the channel.

According to the method for sending an uplink multi-user transmission trigger frame provided in this embodiment of the present disclosure, the AP sends a trigger frame to a STA after the contention succeeds, the trigger frame carries indication information, and the indication information is used to indicate that when a preset condition is met, the AP delivers another trigger frame to the STA in a preset period of time since the STA completes uplink transmission, so that another STA that has not performed uplink transmission or another STA that has not completed uplink transmission can complete uplink transmission.

Embodiment 5

Figure 6:
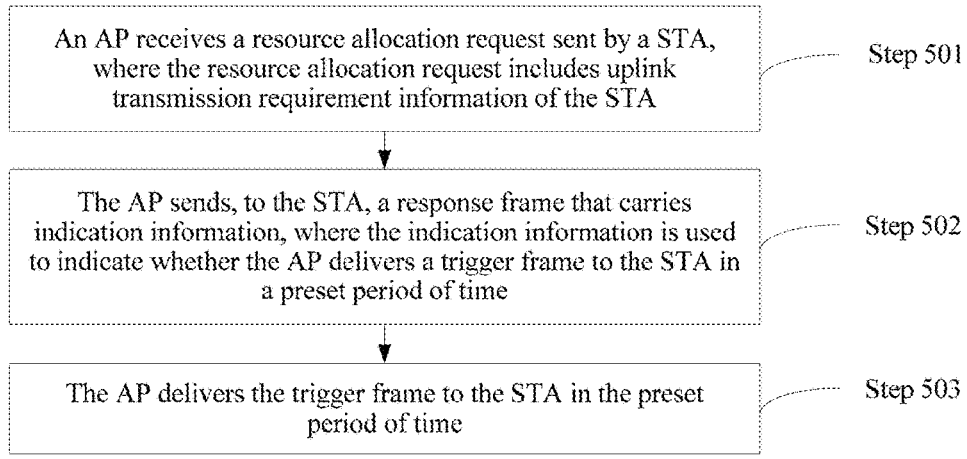
FIG. 6 is a fifth schematic flowchart of a method for sending an uplink multi-user transmission trigger frame according to an embodiment of the present disclosure.

This embodiment of the present disclosure provides another method for sending an uplink multi-user transmission trigger frame, and the method is applied to an AP. As shown in FIG. 6, the method includes the following steps:

Step 501: An AP receives a resource allocation request sent by a STA, where the resource allocation request includes uplink transmission requirement information of the STA.

Step 502: The AP sends, to the STA, a response frame that carries indication information, where the indication information is used to indicate whether the AP delivers a trigger frame to the STA in a preset period of time.

Step 503: The AP delivers the trigger frame to the STA in the preset period of time.

According to the method for sending an uplink multi-user transmission trigger frame provided in this embodiment of the present disclosure, a STA first sends a resource allocation request to an AP before the AP sends a trigger frame, and the resource allocation request includes uplink transmission requirement information of the STA. The AP sends, to the STA according to the uplink transmission requirement information, a response frame that carries indication information, so as to indicate whether the AP delivers the trigger frame to the STA in a preset period of time. Therefore, the STA switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 6

Figure 7:
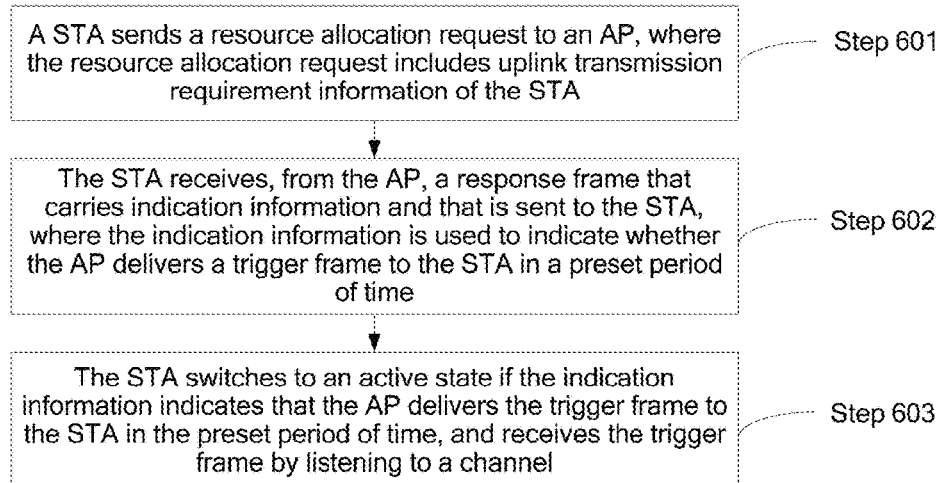
FIG. 7 is a sixth schematic flowchart of a method for sending an uplink multi-user transmission trigger frame according to an embodiment of the present disclosure.

This embodiment of the present disclosure provides another method for sending an uplink multi-user transmission trigger frame, and the method is applied to a STA. As shown in FIG. 7, the method includes the following steps:

Step 601: A STA sends a resource allocation request to an AP, where the resource allocation request includes uplink transmission requirement information of the STA.

Step 602: The STA receives, from the AP, a response frame that carries indication information and that is sent to the STA, where the indication information is used to indicate whether the AP delivers a trigger frame to the STA in a preset period of time.

Step 603: The STA switches to an active state if the indication information indicates that the AP delivers the trigger frame to the STA in the preset period of time, and receives the trigger frame by listening to a channel.

According to the method for sending an uplink multi-user transmission trigger frame provided in this embodiment of the present disclosure, a STA first sends a resource allocation request to an AP before the AP sends a trigger frame, and the resource allocation request includes uplink transmission requirement information of the STA. The AP sends, to the STA according to the uplink transmission requirement information, a response frame that carries indication information, so as to indicate whether the AP delivers the trigger frame to the STA in a preset period of time. Therefore, the STA switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 7

Figure 8:
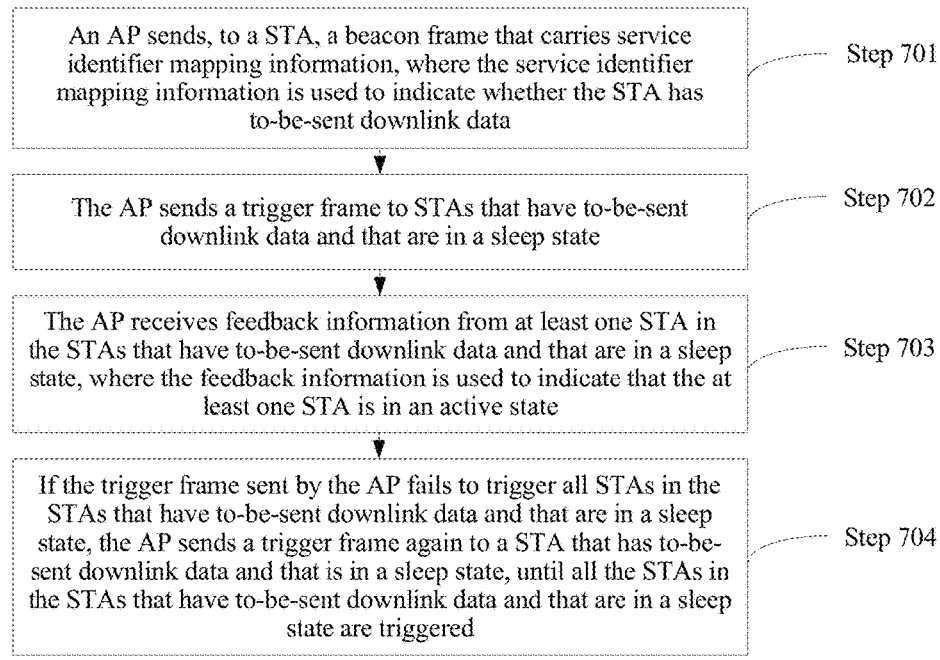
FIG. 8 is a seventh schematic flowchart of a method for sending an uplink multi-user transmission trigger frame according to an embodiment of the present disclosure.

This embodiment of the present disclosure provides a method for sending an uplink multi-user transmission trigger frame, and the method is applied to an AP. As shown in FIG. 8, the method includes the following steps:

Step 701: An AP sends, to a STA, a beacon frame that carries service identifier mapping information, where the service identifier mapping information is used to indicate whether the STA has to-be-receiving downlink data.

Step 702: The AP sends a trigger frame to STAs that have to-be-receiving downlink data and that are in a sleep state.

Step 703: The AP receives feedback information from at least one STA in the STAs that have to-be-receiving downlink data and that are in a sleep state, where the feedback information is used to indicate that the at least one STA is in an active state.

Step 704: If the trigger frame sent by the AP fails to trigger all STAs in the STAs that have to-be-receiving downlink data and that are in a sleep state, the AP sends a trigger frame again to a STA that has to-be-receiving downlink data and that is in a sleep state, until all the STAs in the STAs that have to-be-receiving downlink data and that are in a sleep state are triggered.

According to the method for sending an uplink multi-user transmission trigger frame provided in this embodiment of the present disclosure, an AP sends, to a STA, a beacon frame that carries service identifier mapping information, so as to indicate whether the STA has to-be-receiving downlink data. The STA switches to an active state if the service identifier mapping information indicates that the STA has to-be-receiving downlink data, and receives, by listening to a channel, a trigger frame sent by the AP. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 8

Figure 9:
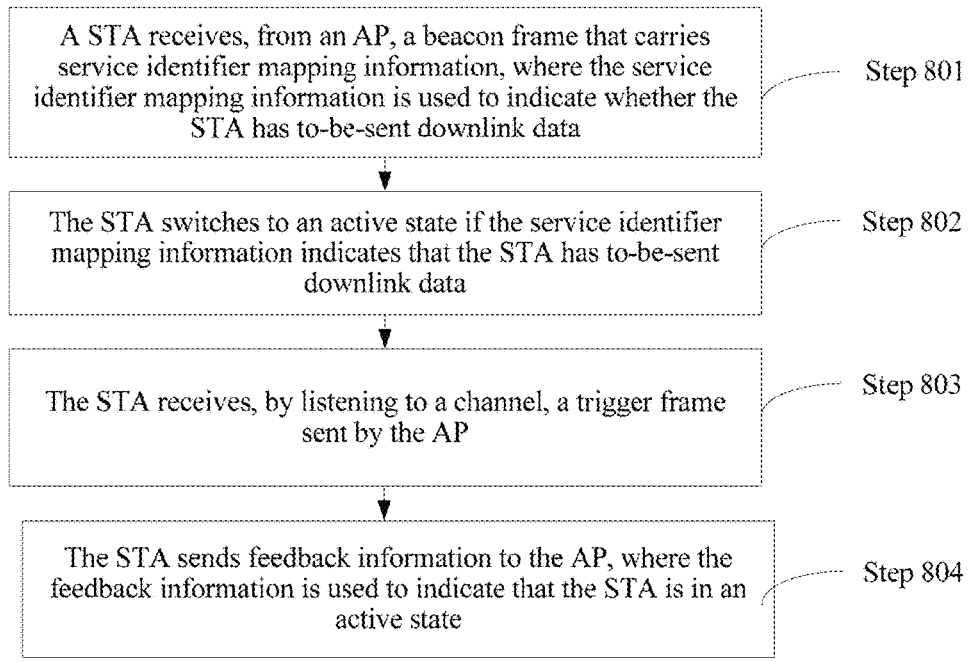
FIG. 9 is an eighth schematic flowchart of a method for sending an uplink multi-user transmission trigger frame according to an embodiment of the present disclosure.

This embodiment of the present disclosure provides a method for sending an uplink multi-user transmission trigger frame, and the method is applied to a STA. As shown in FIG. 9, the method includes the following steps:

Step 801: A STA receives, from an AP, a beacon frame that carries service identifier mapping information, where the service identifier mapping information is used to indicate whether the STA has to-be-receiving downlink data.

Step 802: The STA switches to an active state if the service identifier mapping information indicates that the STA has to-be-receiving downlink data.

Step 803: The STA receives, by listening to a channel, a trigger frame sent by the AP.

Step 804: The STA sends feedback information to the AP, where the feedback information is used to indicate that the STA is in an active state.

According to the method for sending an uplink multi-user transmission trigger frame provided in this embodiment of the present disclosure, an AP sends, to a STA, a beacon frame that carries service identifier mapping information, so as to indicate whether the STA has to-be-receiving downlink data. The STA switches to an active state if the service identifier mapping information indicates that the STA has to-be-receiving downlink data, and receives, by listening to a channel, a trigger frame sent by the AP. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 9

Figure 10:
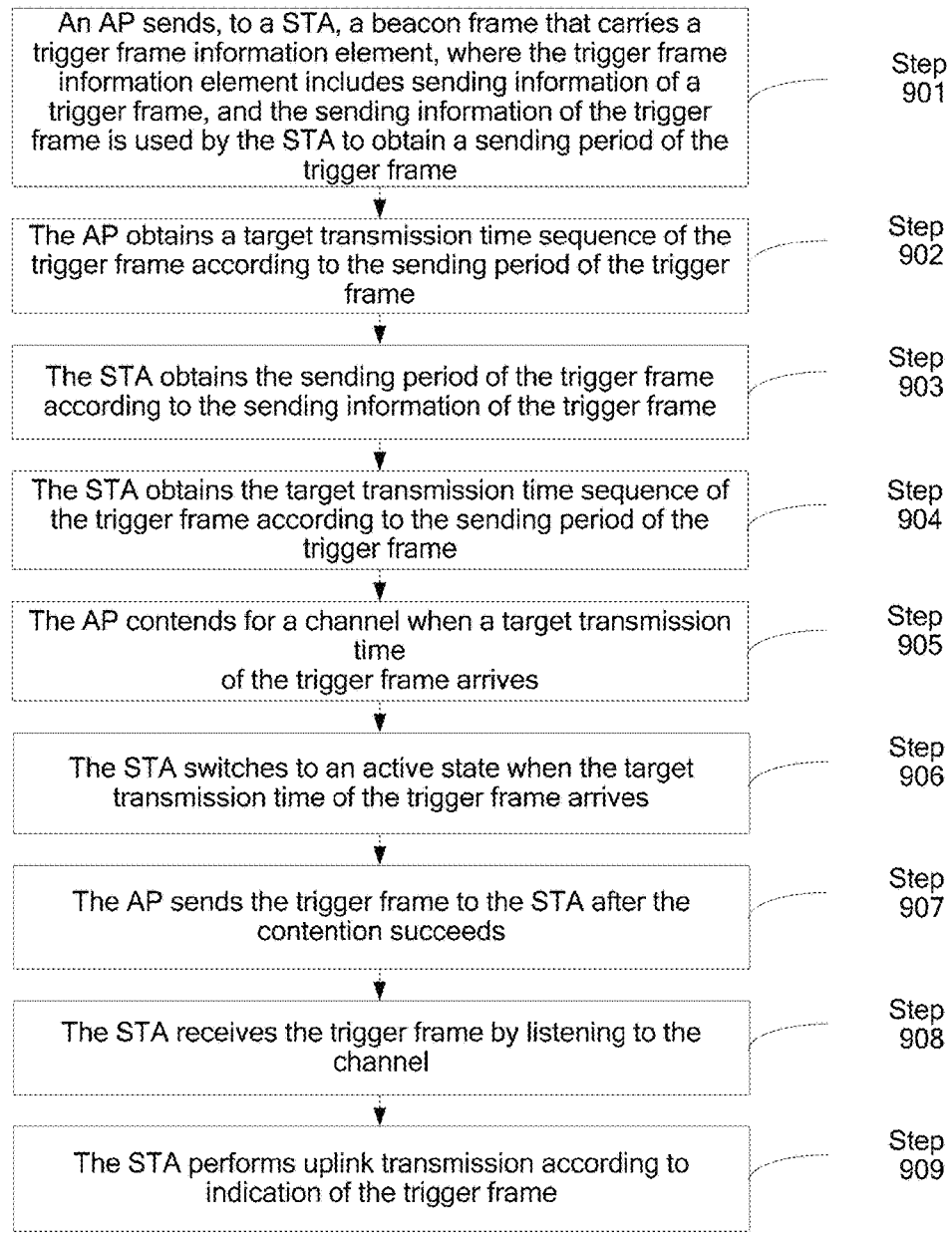
FIG. 10 is a ninth schematic flowchart of a method for sending an uplink multi-user transmission trigger frame according to an embodiment of the present disclosure.

To make persons skilled in the art more clearly understand technical solutions provided in Embodiment 1 and Embodiment 2 of the present disclosure, the following describes in detail, by using a specific embodiment, the method for sending an uplink multi-user transmission trigger frame provided in Embodiment 1 and Embodiment 2 of the present disclosure. An AP generally interacts with multiple STAs at the same time. For ease of description, one STA is used as an example for description in the following embodiment. The STA may be any STA in the multiple STAs. As shown in FIG. 10, the method includes the following steps.

Step 901: An AP sends, to a STA, a beacon frame that carries a trigger frame information element, where the trigger frame information element includes sending information of a trigger frame, and the sending information of the trigger frame is used by the STA to obtain a sending period of the trigger frame.

The sending information may be the sending period of the trigger frame, or may be a quantity of sent trigger frames.

Furthermore, the beacon (Beacon) frame is a frame that is periodically sent by means of broadcasting and that is mainly used to notify presence of a network AP. The beacon frame also needs to be used when an association is established between the STA and the AP.

For example, in a most common WiFi network, an AP (for example, a router) periodically sends a beacon frame, so that a STA (or user equipment (UE)) in coverage of the AP can obtain the beacon frame by means of scanning, and can therefore identify the WiFi network corresponding to the AP. In addition, when the STA accesses the WiFi network, the STA further uses the obtained beacon frame to perform synchronization. The beacon frame is generally in units of milliseconds, each beacon period has same duration, and a next beacon period is generally 100 milliseconds by default.

Step 902: The AP obtains a target transmission time sequence of the trigger frame according to the sending period of the trigger frame.

For example, the target transmission time sequence that is obtained according to the sending period of the trigger frame may include $t_0, t_1, \ldots, t_n$, and $t_0, t_1, \ldots, t_n$ meet $\forall i, j \in \{1, 2, \ldots, n\}$, $t_i - t_{i-j} = t_j - t_{j-1} = T$.

In the sequence, $t_0$ represents a sending time of a first trigger frame. The time may be a default time point, for example, a sending moment of the beacon frame.

Alternatively, the AP may specify a time as the sending time of the first trigger frame. Therefore, optionally, if the trigger frame information element may further include the sending time of the first trigger frame, $t_0$ is equal to the sending time of the first trigger frame in the trigger frame information element.

Optionally, before sending a trigger frame, the AP needs to contend for a channel to obtain use permission of the channel. Therefore, an actual sending time of the trigger frame may be later than target transmission time in the target transmission time sequence. In order that when the trigger frame is sent, the STA remains in an active state to receive the trigger frame, the trigger frame information element may further include a trigger frame send window size, and the trigger frame send window size is used to indicate an adjustment range of a sending time of the trigger frame.

Correspondingly, that the AP obtains a target transmission time sequence of the trigger frame according to the sending period of the trigger frame includes: obtaining the target transmission time sequence of the trigger frame according to the trigger frame send window size and the sending period of the trigger frame.

The target transmission time sequence includes:
$t_0 + A_0, t_1 + A_1, \ldots, t_n + A_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}$, $-U < A_i < U$, is the trigger frame send window size. $A_0, A_1, \ldots, A_n$ are determined by the AP.

Figure 11:
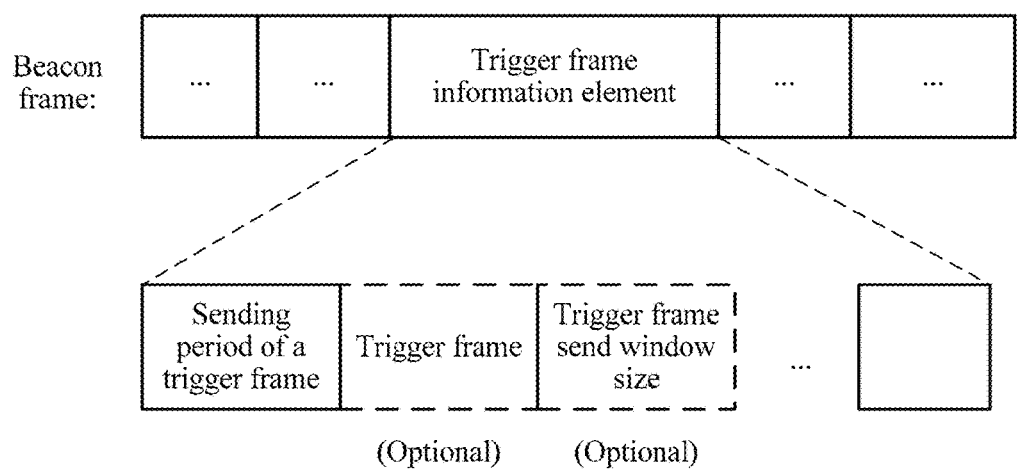
FIG. 11 is a schematic structural diagram of a beacon frame in a method for sending an uplink multi-user transmission trigger frame according to an embodiment of the present disclosure.

Therefore, in conclusion, for example, as shown in FIG. 11, the following field such as the sending period of the trigger frame (Trigger Frame Interval) or the quantity of the trigger frame (Trigger Frame Number) may be newly added to the beacon frame. Optionally (referring to a dashed line), the sending time of the first trigger frame (Trigger Frame Start Time) and/or the trigger frame send window size (Trigger Frame Window Size) may further be included.

Step 903: The STA obtains the sending period of the trigger frame according to the sending information of the trigger frame.

If the sending information is the sending period of the trigger frame, the sending period of the trigger frame may be obtained by reading the sending information. If the sending information is the quantity of sent trigger frames, the sending period of the trigger frame may be obtained by dividing a sending period of the beacon frame by the quantity of sent trigger frames.

Step 904: The STA obtains the target transmission time sequence of the trigger frame according to the sending period of the trigger frame.

Corresponding to step 902, the target transmission time sequence that is obtained by the STA according to the sending period of the trigger frame may include $t_0, t_1, \ldots, t_n$, and $t_0, t_1, \ldots, t_n$ meet $\forall i, j \in \{1, 2, \ldots, n\}$, $t_{i-1} = t_j - t_{j-1} = T$.

In the sequence, $t_0$ represents the sending time of the first trigger frame. The time may be a default time point, for example, the sending moment of the beacon frame.

Optionally, if the trigger frame information element in the received beacon frame further includes the sending time of the first trigger frame, $t_0$ is equal to the sending time of the first trigger frame in the trigger frame information element.

Optionally, if the trigger frame information element in the received beacon frame further includes the trigger frame send window size, that the STA obtains the target transmission time sequence of the trigger frame according to the sending period of the trigger frame includes:

obtaining the target transmission time sequence of the trigger frame according to the trigger frame send window size and the sending period of the trigger frame, where the target transmission time sequence includes:

$t_0 - U, t_1 - U, \ldots, t_n - U$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, and U is the trigger frame send window size.

That is, the target transmission time sequence obtained in this case is a sequence of earliest time points at which trigger frames may arrive.

Step 905: The AP contends for a channel when a target transmission time of the trigger frame arrives, where the target transmission time is any time point in the target transmission time sequence.

For example, if the target transmission time sequence obtained in step 902 is $t_0, t_1, \ldots, t_n$, when any time point in $t_0, t_1, \ldots, t_n$ arrives, the AP starts to contend for the channel.

Alternatively, if the target transmission time sequence obtained in step 902 is $t_0 + A_0, t_1 + A_1, \ldots, t_n + A_n$, when any time point in $t_0 + A_0, t_1 + A_1, \ldots, t_n + A_n$ starting from $t_0 + A_0$ arrives, the AP starts to contend for the channel.

Step 906: The STA switches to an active state when the target transmission time of the trigger frame arrives.

When the target transmission time of the trigger frame arrives, the AP starts to contend for the channel, and the STA switches to an active state at the same time, and prepares to receive a trigger frame sent by the AP after the contention succeeds.

Step 907: The AP sends the trigger frame to the STA after the contention succeeds.

Step 908: The STA receives the trigger frame by listening to the channel.

After the AP implements successful contending, the AP obtains use permission of the channel, so that the STA can receive, by listening to the channel, the trigger frame sent by the AP.

Step 909: The STA performs uplink transmission according to indication of the trigger frame.

Furthermore, it should be noted that the trigger frame includes two types: a trigger frame that supports scheduling transmission or a trigger frame that supports random contention transmission.

The trigger frame sent by the AP in this embodiment of the present disclosure may be either one of the foregoing two types. Therefore, the sending period of the trigger frame may be a sending period of the trigger frame that supports scheduling transmission or a sending period of the trigger frame that supports random contention transmission.

Alternatively, the trigger frame sent by the AP in this embodiment of the present disclosure may include both of the foregoing two types, that is, the AP sends two trigger frames, one is the trigger frame that supports scheduling transmission, and the other is the trigger frame that supports random contention transmission. Therefore, the sending period of the trigger frame may include a first sending period and a second sending period, the first sending period is a sending period of the trigger frame that supports scheduling transmission, and the second sending period is a sending period of the trigger frame that supports random contention transmission. A method for obtaining the first sending period is the same as a method for obtaining the second sending period, and both the first sending period and the second sending period may be directly sent by the AP by using a beacon frame, or may be obtained by calculation by using a quantity of trigger frames sent by the AP. A method for obtaining the target transmission time sequence according to the first sending period is also the same as a method for obtaining the target transmission time sequence according to the second sending period. For details, refer to step 902 and step 904.

According to the method for sending an uplink multi-user transmission trigger frame provided in this embodiment of the present disclosure, the AP sends, to a STA, a beacon frame that carries a trigger frame information element, the trigger frame information element includes sending information of a trigger frame, and the sending information may be a sending period of the trigger frame or a quantity of sent trigger frames. The STA obtains a target transmission time sequence of the trigger frame according to the sending information after receiving the beacon frame. The AP contends for a channel when a target transmission time of the trigger frame arrives, and the AP sends the trigger frame to the STA after the contention succeeds. In this case, the STA switches to an active state, and receives the trigger frame by listening to the channel, and the STA performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 10

Figure 12:
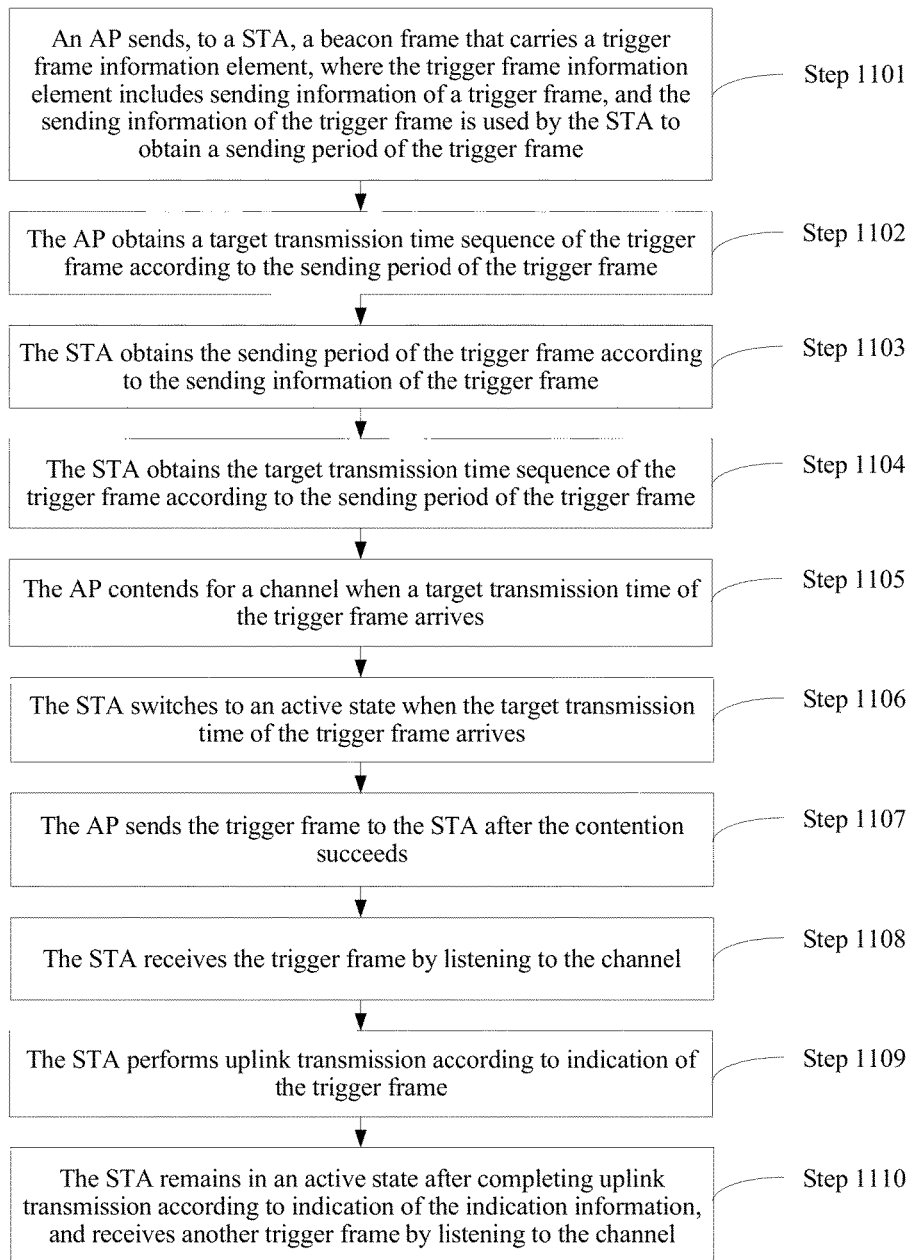
FIG. 12 is a tenth schematic flowchart of a method for sending an uplink multi-user transmission trigger frame according to an embodiment of the present disclosure.

To make persons skilled in the art more clearly understand technical solutions provided in Embodiment 3 and Embodiment 4 of the present disclosure, the following describes in detail, by using a specific embodiment, the another method for sending an uplink multi-user transmission trigger frame provided in Embodiment 3 and Embodiment 4 of the present disclosure. An AP generally interacts with multiple STAs at the same time. For ease of description, one STA is used as an example for description in the following embodiment. The STA may be any STA in the multiple STAs. As shown in FIG. 12, the method includes the following steps.

Step 1101: An AP sends, to a STA, a beacon frame that carries a trigger frame information element, where the trigger frame information element includes sending information of a trigger frame, and the sending information of the trigger frame is used by the STA to obtain a sending period of the trigger frame.

The sending information may be the sending period of the trigger frame, or may be a quantity of sent trigger frames.

Step 1102: The AP obtains a target transmission time sequence of the trigger frame according to the sending period of the trigger frame (Specifically, step 1102 is the same as step 902, reference may be made to step 902, and details are not repeatedly described).

Step 1103: The STA obtains the sending period of the trigger frame according to the sending information of the trigger frame.

Step 1104: The STA obtains the target transmission time sequence of the trigger frame according to the sending period of the trigger frame (A specific step is the same as step 904, reference may be made to step 904, and details are not repeatedly described).

Step 1105: The AP contends for a channel when a target transmission time of the trigger frame arrives, where the target transmission time is any time point in the target transmission time sequence (A specific step is the same as step 905, reference may be made to step 905, and details are not repeatedly described).

Step 1106: The STA switches to an active state when the target transmission time of the trigger frame arrives.

When the target transmission time of the trigger frame arrives, the AP starts to contend for the channel, and the STA switches to an active state at the same time, and prepares to receive a trigger frame sent by the AP after the contention succeeds.

Step 1107: The AP sends the trigger frame to the STA after the contention succeeds.

The indication information is used to indicate that when a preset condition is met, the AP delivers another trigger frame to the STA in a preset period of time since the STA completes uplink transmission.

The preset condition may include:

after the STA completes uplink transmission, there is another STA that needs to be triggered by the AP to perform uplink transmission, or after the STA completes uplink transmission, there is another STA that has not completed uplink transmission.

The preset period of time may be set to a relatively short period of time. That is, when the trigger frame delivered by the AP carries the indication information, it indicates that when the STA meets the preset condition, the AP immediately delivers the other trigger frame.

Figure 13:
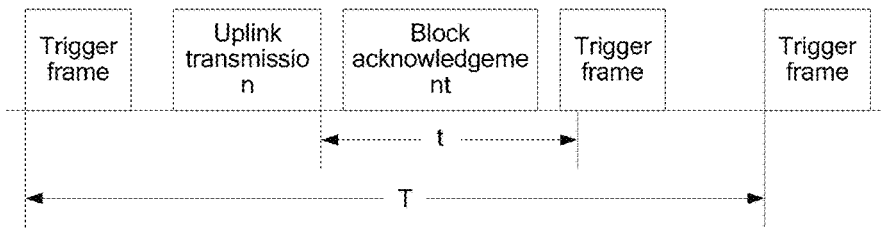
FIG. 13 is another first schematic flowchart of a method for sending an uplink multi-user transmission trigger frame according to an embodiment of the present disclosure.

For example, a process of step 1107 may be shown in FIG. 13. In FIG. 13, T is the sending period of the trigger frame, t is the preset period of time, and BA refers to block acknowledgement. It can be learned that in a normal case, after a trigger frame is sent, the AP delivers a trigger frame again after an interval of T. However, because a trigger frame received this time carries indication information, in a period of time t since completion of uplink transmission, the STA immediately receives another trigger frame sent by the AP.

Step 1108: The STA receives the trigger frame by listening to the channel.

After the AP implements successful contending, the AP obtains use permission of the channel, so that the STA can receive, by listening to the channel, the trigger frame sent by the AP.

Step 1109: The STA performs uplink transmission according to indication of the trigger frame.

Step 1110: The STA remains in an active state after completing uplink transmission according to indication of the indication information, and receives another trigger frame by listening to the channel.

Furthermore, it should be noted that in the foregoing solution provided in this embodiment, after the AP sends a trigger frame to the STA, if the preset condition is met, the AP immediately sends another trigger frame to the STA. The solution is not only applicable to the foregoing scenario, but also can be applied to another scenario. For example, the solution is also applicable to the following embodiment. That is, regardless of an implementation manner for sending and receiving a trigger frame, after the AP sends a trigger frame to the STA, when the preset condition is met, the AP may immediately send another trigger frame to the STA.

According to the method for sending an uplink multi-user transmission trigger frame provided in this embodiment of the present disclosure, an AP adds indication information to a trigger frame that is sent to a STA, and the indication information is used to indicate that when a preset condition is met, the AP delivers another trigger frame to the STA in a preset period of time since the STA completes uplink transmission, so that another STA that has not performed uplink transmission or another STA that has not completed uplink transmission can complete uplink transmission.

Embodiment 11

Figure 14:
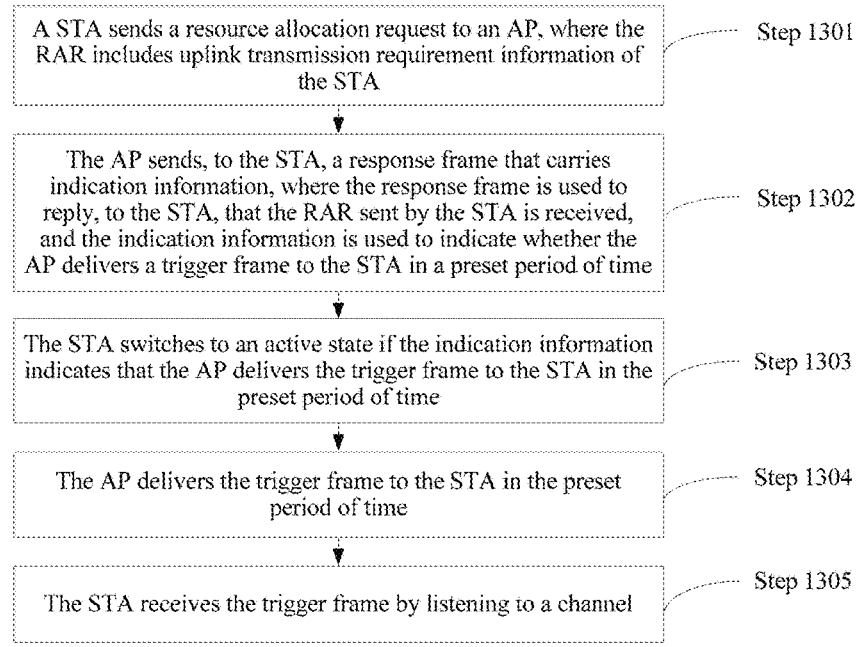
FIG. 14 is an eleventh schematic flowchart of a method for sending an uplink multi-user transmission trigger frame according to an embodiment of the present disclosure.

To make persons skilled in the art more clearly understand technical solutions provided in Embodiment 5 and Embodiment 6 of the present disclosure, the following describes in detail, by using a specific embodiment, the another method for sending an uplink multi-user transmission trigger frame provided in Embodiment 5 and Embodiment 6 of the present disclosure. An AP generally interacts with multiple STAs at the same time. For ease of description, one STA is used as an example for description in the following embodiment. The STA may be any STA in the multiple STAs. As shown in FIG. 14, the method includes the following steps.

Step 1301: A STA sends a resource allocation request (RAR) to an AP, where the RAR includes uplink transmission requirement information of the STA.

The uplink transmission requirement information includes information such as a data amount, a data type, and a service priority of uplink transmission of the STA.

Step 1302: The AP sends, to the STA, a response frame that carries indication information, where the response frame is used to reply, to the STA, that the RAR sent by the STA is received, and the indication information is used to indicate whether the AP delivers a trigger frame to the STA in a preset period of time.

Step 1303: The STA switches to an active state if the indication information indicates that the AP delivers the trigger frame to the STA in the preset period of time.

Step 1304: The AP delivers the trigger frame to the STA in the preset period of time.

Figure 15:
FIG. 15 is another second schematic flowchart of a method for sending an uplink multi-user transmission trigger frame according to an embodiment of the present disclosure.

Step 1305: The STA receives the trigger frame by listening to a channel. For example, a process of step 1305 may be shown in FIG. 15.

According to the method for sending an uplink multi-user transmission trigger frame provided in this embodiment of the present disclosure, a STA first sends a resource allocation request to an AP before the AP sends a trigger frame, and the resource allocation request includes uplink transmission requirement information of the STA. The AP sends, to the STA according to the uplink transmission requirement information, a response frame that carries indication information, so as to indicate whether the AP delivers the trigger frame to the STA in a preset period of time. Therefore, the STA switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 12

Figures 16, 17:
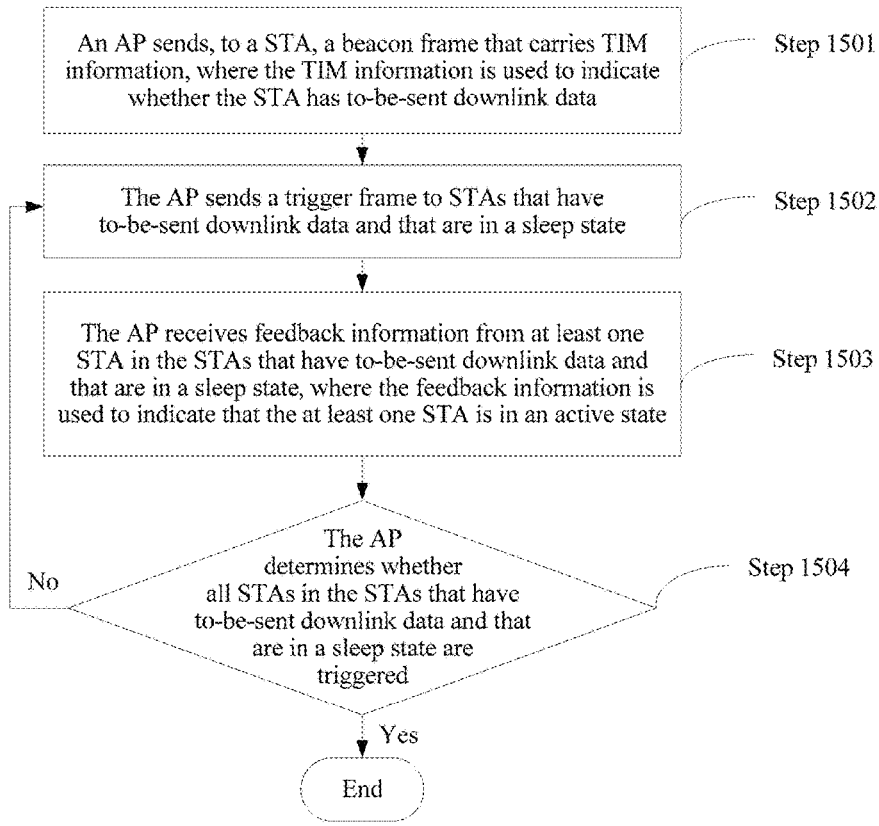
FIG. 16 is a twelfth schematic flowchart of a method for sending an uplink multi-user transmission trigger frame according to an embodiment of the present disclosure.
FIG. 17 is a schematic diagram of TIM information in a method for sending an uplink multi-user transmission trigger frame according to an embodiment of the present disclosure.

To make persons skilled in the art more clearly understand technical solutions provided in Embodiment 7 and Embodiment 8 of the present disclosure, the following describes in detail, by using a specific embodiment, the another method for sending an uplink multi-user transmission trigger frame provided in Embodiment 7 and Embodiment 8 of the present disclosure. An AP generally interacts with multiple STAs at the same time. For ease of description, one STA is used as an example for description in the following embodiment. The STA may be any STA in the multiple STAs. As shown in FIG. 16, the method includes the following steps.

Step 1501: An AP sends, to a STA, a beacon frame that carries service identifier mapping (Traffic Indication Map, TIM for short) information, where the TIM information is used to indicate whether the STA has to-be-receiving downlink data.

For example, the TIM information may be shown in FIG. 17. An AID in the figure is an association identifier. Each bit (bit) in the TIM information is merely used to indicate whether a corresponding STA that is in a sleep state has to-be-receiving downlink data. If a value of a bit is 1, it indicates that a STA that is in a sleep state and that is corresponding to the bit has to-be-receiving downlink data. If a value of a bit is 0, it indicates that a STA that is in a sleep state and that is corresponding to the bit does not have to-be-receiving downlink data.

Step 1502: The AP sends a trigger frame to STAs that have to-be-receiving downlink data and that are in a sleep state.

Step 1503: The AP receives feedback information from at least one STA in the STAs that have to-be-receiving downlink data and that are in a sleep state, where the feedback information is used to indicate that the at least one STA is in an active state.

The feedback information includes a PS (power save)—poll frame, buffer information, or uplink data.

Step 1504: The AP determines whether all STAs in the STAs that have to-be-receiving downlink data and that are in a sleep state are triggered, and if not all the STAs are triggered, step 1502 to step 1504 are performed again, until all the STAs in the STAs that have to-be-receiving downlink data and that are in a sleep state are triggered.

In another possible implementation manner, in addition to the TIM information, the beacon frame includes indication information, and the indication information may be a bitmap (Trigger Indication Map) or offset information.

Figure 18:
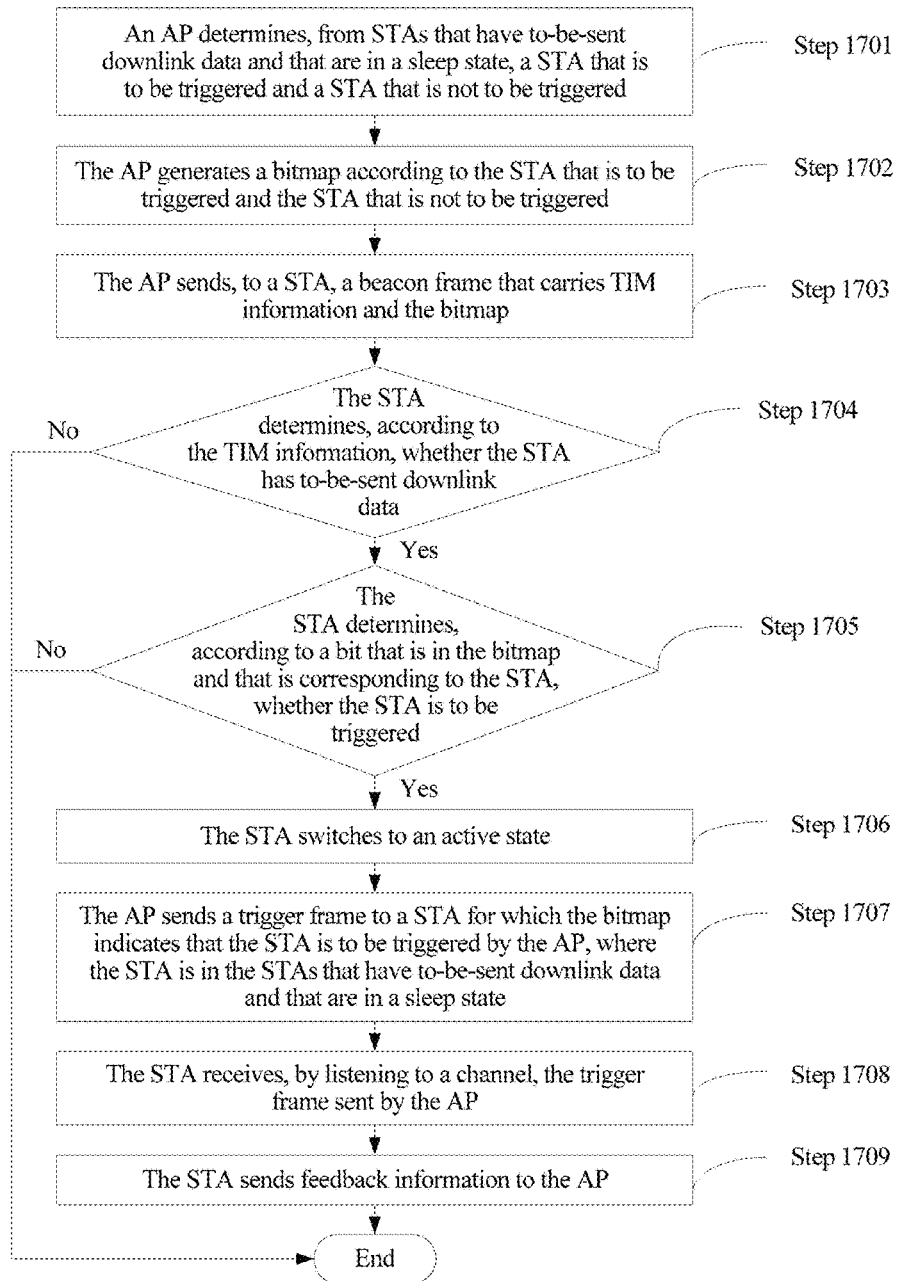
FIG. 18 is a thirteenth schematic flowchart of a method for sending an uplink multi-user transmission trigger frame according to an embodiment of the present disclosure.

If the indication information is the bitmap, as shown in FIG. 18, the method for sending an uplink multi-user transmission trigger frame includes the following steps.

Step 1701: The AP determines, from the STAs that have to-be-receiving downlink data and that are in a sleep state, a STA that is to be triggered and a STA that is not to be triggered.

Step 1702: The AP generates the bitmap according to the STA that is to be triggered and the STA that is not to be triggered.

Figure 19:
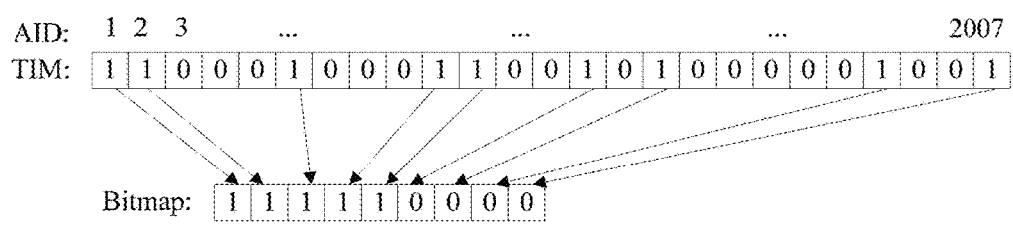
FIG. 19 is a schematic diagram of a bitmap in a method for sending an uplink multi-user transmission trigger frame according to an embodiment of the present disclosure.

For example, the bitmap may be shown in FIG. 19. Each bit in the bitmap is used to perform indication on a STA corresponding to a bit whose value is 1 in the TIM information. If a bit in the bitmap is 1, a STA corresponding to the bit is to be triggered by the AP, and if a bit in the bitmap is 0, a STA corresponding to the bit is not to be triggered by the AP.

Step 1703: The AP sends, to the STA, the beacon frame that carries the TIM information and the bitmap.

Step 1704: The STA determines, according to the TIM information, whether the STA has to-be-receiving downlink data, and if the STA has to-be-receiving downlink data, step 1705 is performed; otherwise, the process ends.

Step 1705: The STA determines, according to a bit that is in the bitmap and that is corresponding to the STA, whether the STA is to be triggered, and if the STA is to be triggered, step 1706 is performed; otherwise, the process ends.

Step 1706: The STA switches to an active state.

Step 1707: The AP sends a trigger frame to a STA for which the bitmap indicates that the STA is to be triggered by the AP, where the STA is in the STAs that have to-be-receiving downlink data and that are in a sleep state.

Step 1708: The STA receives, by listening to a channel, the trigger frame sent by the AP.

Step 1709: The STA sends the feedback information to the AP, where the feedback information includes a PS-Poll frame, buffer information, or uplink data.

Optionally, the method may further include:

determining, by the AP, whether all STAs in the STAs for which the bitmap indicates that the STAs are to be triggered by the AP are triggered; and if not all the STAs are triggered, performing step 1707 again, until all the STAs in the STAs for which the bitmap indicates that the STAs are to be triggered by the AP are triggered (not shown in the figure).

Figure 20:
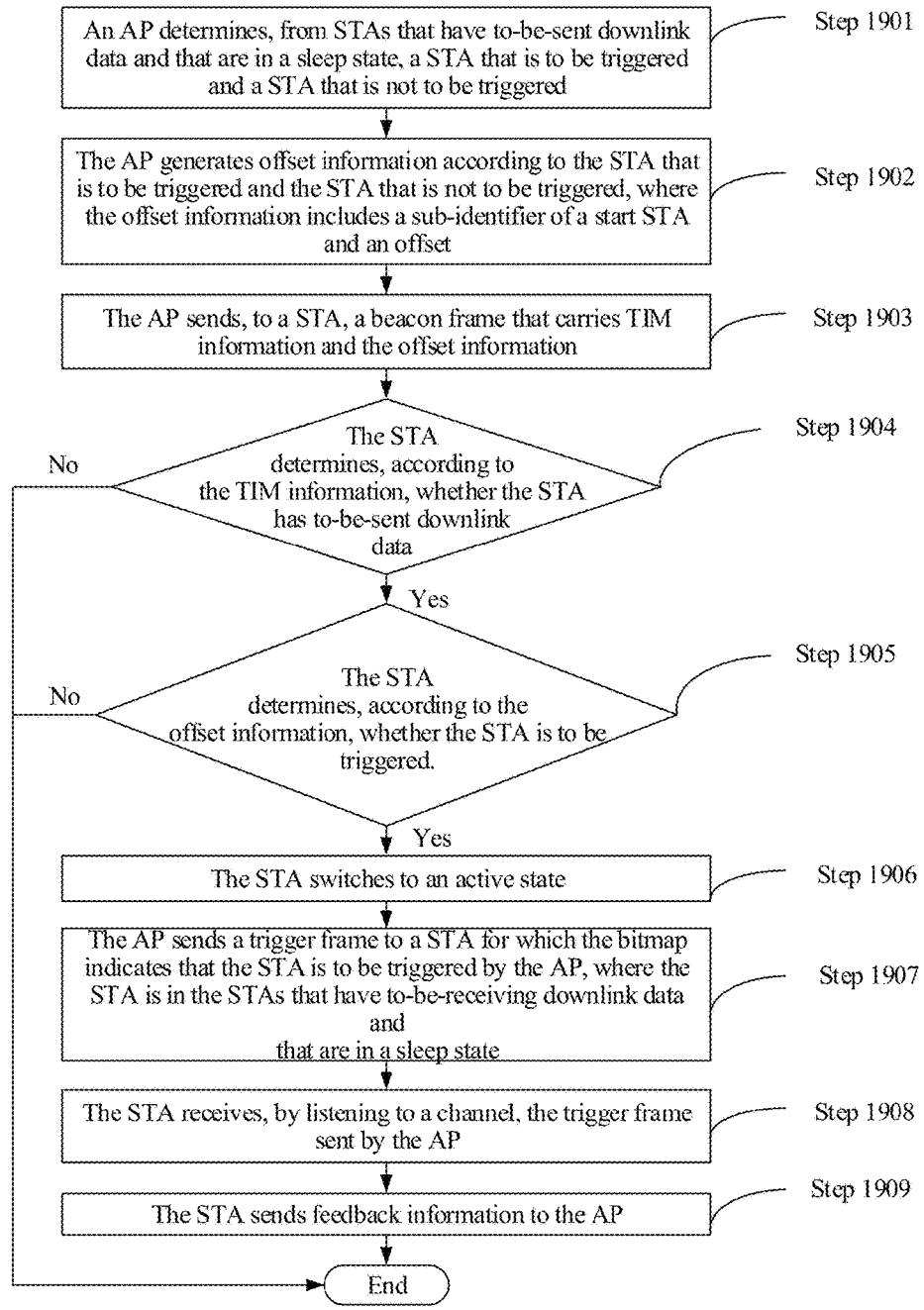
FIG. 20 is a fourteenth schematic flowchart of a method for sending an uplink multi-user transmission trigger frame according to an embodiment of the present disclosure.

If the indication information is the offset information, as shown in FIG. 20, the method for sending an uplink multi-user transmission trigger frame includes the following steps.

Step 1901: The AP determines, from the STAs that have to-be-receiving downlink data and that are in a sleep state, a STA that is to be triggered and a STA that is not to be triggered.

Step 1902: The AP generates the offset information according to the STA that is to be triggered and the STA that is not to be triggered, where the offset information includes a sub-identifier (Sub ID) of a start STA and an offset.

For example, the offset information may be shown in FIG. 21. A sub-identifier of a STA may be determined according to a value of a bit that is in the TIM and that is corresponding to the STA. As shown in FIG. 21, sub-identifiers of the STAs that have to-be-receiving downlink data and that are in a sleep state may be obtained by sequentially numbering, from the first bit whose value is 1 in the TIM, bits whose values are 1.

Therefore, a STA that is to be triggered may be determined according to the sub-identifier of the start STA and the offset.

Step 1903: The AP sends, to the STA, the beacon frame that carries the TIM information and the offset information.

Step 1904: The STA determines, according to the TIM information, whether the STA has to-be-receiving downlink data, and if the STA has to-be-receiving downlink data, step 1905 is performed; otherwise, the process ends.

Step 1905: The STA determines, according to the offset information, whether the STA is to be triggered, and if the STA is to be triggered, step 1906 is performed; otherwise, the process ends.

Specifically, it may be determined whether he sub-identifier of the STA falls within a range of [Sub ID, Sub ID+Offset], and then it may be determined whether the STA is to be triggered. For example, if a sub-identifier of the STA is 3, the sub-identifier of the start STA is 1, and the offset is 8, 3 falls within a range of [1, 1+8]. Therefore, it may be determined that the STA is to be triggered by the AP.

Step 1906: The STA switches to an active state.

Step 1907: The AP sends a trigger frame to a STA for which the offset information indicates that the STA is to be triggered by the AP, where the STA is in the STAs that have to-be-receiving downlink data and that are in a sleep state.

Step 1908: The STA receives, by listening to a channel, the trigger frame sent by the AP.

Step 1909: The STA sends the feedback information to the AP, where the feedback information includes a PS-Poll frame, buffer information, or uplink data.

Optionally, the method may further include:

determining, by the AP, whether all STAs in the STAs for which the offset information indicates that the STAs are to be triggered by the AP are triggered; and if not all the STAs are triggered, performing step 1907 again, until all the STAs in the STAs for which the offset information indicates that the STAs are to be triggered by the AP are triggered (not shown in the figure).

According to the method for sending an uplink multi-user transmission trigger frame provided in this embodiment of the present disclosure, an AP sends, to a STA, a beacon frame that carries service identifier mapping information, so as to indicate whether the STA has to-be-receiving downlink data. The STA switches to an active state if the service identifier mapping information indicates that the STA has to-be-receiving downlink data, and receives, by listening to a channel, a trigger frame sent by the AP. It can be learned that there is no need to add information to the trigger frame, thereby reducing signaling overheads, and avoiding impact of a trigger frame failure on a next trigger frame. In this way, when signaling overheads are not increased and reliability is ensured, a STA can learn of a sending time of a trigger frame, and the STA remains in a receiving state in an appropriate period of time.

Embodiment 13

This embodiment of the present disclosure provides an access point 01. As shown in FIG. 22, the access point 01 includes a sending unit 011 and a processing unit 012.

The sending unit 011 is configured to send, to a station, a beacon frame that carries a trigger frame information element, where the trigger frame information element includes sending information of a trigger frame, and the sending information of the trigger frame is used by the station to obtain a sending period of the trigger frame.

The processing unit 012 is configured to obtain a target transmission time sequence of the trigger frame according to the sending period of the trigger frame.

The processing unit 012 is further configured to contend for a channel when a target transmission time of the trigger frame arrives.

The sending unit 011 is further configured to send the trigger frame to the station after the contention succeeds, where the target transmission time is any time point in the target transmission time sequence.

Optionally, the sending information of the trigger frame is the sending period of the trigger frame or a quantity of sent trigger frames.

Optionally, the trigger frame information element further includes a sending time of a first trigger frame; and the processing unit 012 is specifically configured to:

obtain the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

Optionally, the trigger frame information element further includes a trigger frame send window size, and the trigger frame send window size is used to indicate an adjustment range of a sending time of the trigger frame; and the processing unit 012 is specifically configured to:

obtain the target transmission time sequence of the trigger frame according to the trigger frame send window size and the sending period of the trigger frame, where the target transmission time sequence includes:

$t_0+A_0, t_1+A_1, \ldots, t_n+A_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}$, $-U < A_i < U$, and U is the trigger frame send window size.

Optionally, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

Optionally, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

This embodiment of the present disclosure provides an access point. The access point sends, to a station, a beacon frame that carries a trigger frame information element, the trigger frame information element includes sending information of a trigger frame, and the sending information may be a sending period of the trigger frame or a quantity of sent trigger frames. The station obtains a target transmission time sequence of the trigger frame according to the sending information after receiving the beacon frame. The access point contends for a channel when a target transmission time of the trigger frame arrives, and the access point sends the trigger frame to the station after the contention succeeds. In this case, the station switches to an active state, and receives the trigger frame by listening to the channel, and the station performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 14

This embodiment of the present disclosure provides a station 02. As shown in FIG. 23, the station 02 includes a receiving unit 021, a processing unit 022, and a sending unit 023.

The receiving unit 021 is configured to receive, from an access point, a beacon frame that carries a trigger frame information element, where the trigger frame information element includes sending information of a trigger frame.

The processing unit 022 is configured to obtain a sending period of the trigger frame according to the sending information of the trigger frame.

The processing unit 022 is further configured to obtain a target transmission time sequence of the trigger frame according to the sending period of the trigger frame.

The processing unit 022 is further configured to switch to an active state when a target transmission time of the trigger frame arrives.

The receiving unit 021 is further configured to receive the trigger frame by listening to a channel, where the target transmission time is any time point in the target transmission time sequence.

The sending unit 023 is configured to perform uplink transmission according to indication of the trigger frame.

Optionally, the sending information of the trigger frame is the sending period of the trigger frame or a quantity of sent trigger frames.

Optionally, the trigger frame information element further includes a sending time of a first trigger frame; and the processing unit 022 is specifically configured to:

obtain the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

Optionally, the trigger frame information element further includes a trigger frame send window size, and the trigger frame send window size is used to indicate an adjustment range of a sending time of the trigger frame; and the processing unit 022 is specifically configured to:

obtain the target transmission time sequence of the trigger frame according to the trigger frame send window size and the sending period of the trigger frame, where the target transmission time sequence includes:

$t_0 - U, t_1 - U, \ldots, t_n - U$, where $t_0, t_1, \ldots, t_n$ meet $\forall i, j \in \{1, 2, \ldots, \}$, $t_i - t_{i-1} = t_j - t_{j-1} = T$, T is equal to the sending period of the trigger frame, $t_0, t_1, \ldots, t_n$ are a periodic sequence whose period is T, and U is the trigger frame send window size.

Optionally, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

Optionally, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

This embodiment of the present disclosure provides a station. The station receives, from an access point, a beacon frame that carries a trigger frame information element, the trigger frame information element includes sending information of a trigger frame, and the sending information may be a sending period of the trigger frame or a quantity of sent trigger frames. The station obtains a target transmission time sequence of the trigger frame according to the sending information after receiving the beacon frame. The access point contends for a channel when a target transmission time of the trigger frame arrives, and the access point sends the trigger frame to the station after the contention succeeds. In this case, the station switches to an active state, and receives the trigger frame by listening to the channel, and the station performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 15

Figure 24:
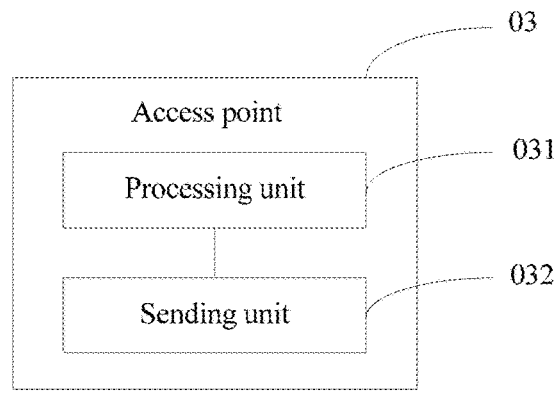
FIG. 24 is a schematic structural diagram of another access point according to an embodiment of the present disclosure.

This embodiment of the present disclosure provides an access point 03. As shown in FIG. 24, the access point 03 includes a processing unit 031 and a sending unit 032.

The processing unit 031 is configured to contend for a channel.

The sending unit 032 is configured to send a trigger frame to a station after the contention succeeds, where the trigger frame carries indication information, and the indication information is used to indicate that when a preset condition is met, the access point delivers another trigger frame to the station in a preset period of time since the station completes uplink transmission.

Optionally, the preset condition includes:

after the station completes uplink transmission, there is another station that needs to be triggered by the access point to perform uplink transmission, or after the station completes uplink transmission, there is another station that has not completed uplink transmission.

This embodiment of the present disclosure provides an access point. The access point adds indication information to a trigger frame that is sent to a station, and the indication information is used to indicate that when a preset condition is met, the access point delivers another trigger frame to the station in a preset period of time since the station completes uplink transmission, so that another station that has not performed uplink transmission or another station that has not completed uplink transmission can complete uplink transmission.

Embodiment 16

Figure 25:
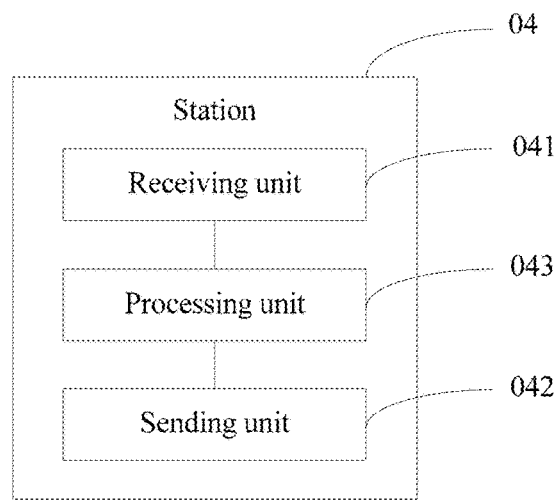
FIG. 25 is a schematic structural diagram of another station according to an embodiment of the present disclosure.

This embodiment of the present disclosure provides a station 04. As shown in FIG. 25, the station 04 includes a receiving unit 041, a sending unit 042, and a processing unit 043.

The receiving unit 041 is further configured to receive, by listening to a channel, a trigger frame sent by an access point, where the trigger frame carries indication information, and the indication information is used to indicate that when a preset condition is met, the access point delivers another trigger frame to the station in a preset period of time since the station completes uplink transmission.

The sending unit 042 is configured to perform uplink transmission according to indication of the trigger frame.

The processing unit 043 is configured to remain in an active state after uplink transmission is completed according to indication of the indication information.

The receiving unit 041 is further configured to receive the another trigger frame by listening to the channel.

Optionally, the preset condition includes:

after the station completes uplink transmission, there is another station that needs to be triggered by the access point to perform uplink transmission, or after the station completes uplink transmission, there is another station that has not completed uplink transmission.

This embodiment of the present disclosure provides a station. An access point adds indication information to a trigger frame that is sent to the station, and the indication information is used to indicate that when a preset condition is met, the access point delivers another trigger frame to the station in a preset period of time since the station completes uplink transmission, so that another station that has not performed uplink transmission or another station that has not completed uplink transmission can complete uplink transmission.

Embodiment 17

Figure 26:
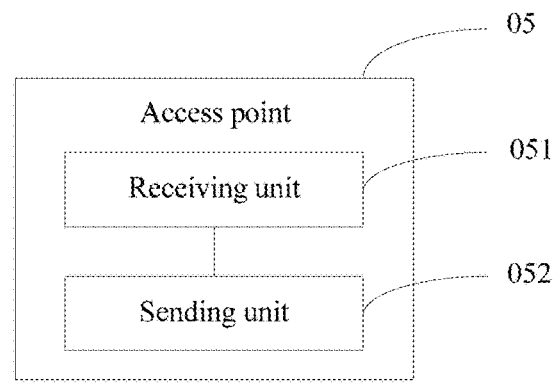
FIG. 26 is a schematic structural diagram of another access point according to an embodiment of the present disclosure.

This embodiment of the present disclosure provides an access point 05. As shown in FIG. 26, the access point 05 includes a receiving unit 051 and a sending unit 052.

The receiving unit 051 is configured to receive a resource allocation request sent by a station, where the resource allocation request includes uplink transmission requirement information of the station.

The sending unit 052 is configured to send, to the station, a response frame that carries indication information, where the indication information is used to indicate whether the access point delivers a trigger frame to the station in a preset period of time.

The sending unit 052 is further configured to deliver the trigger frame to the station in the preset period of time.

Optionally, the uplink transmission requirement information includes a data amount, a data type, and a service priority of uplink transmission of the station.

This embodiment of the present disclosure provides an access point. A station first sends a resource allocation request to the access point before the access point sends a trigger frame, and the resource allocation request includes uplink transmission requirement information of the station. The access point sends, to the station according to the uplink transmission requirement information, a response frame that carries indication information, so as to indicate whether the access point delivers the trigger frame to the station in a preset period of time. Therefore, the station switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 18

Figure 27:
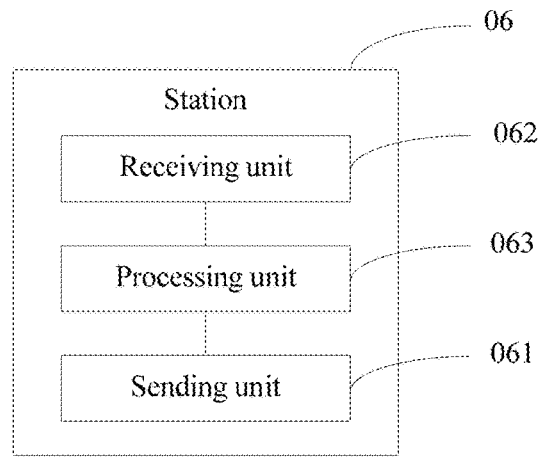
FIG. 27 is a schematic structural diagram of another station according to an embodiment of the present disclosure.

This embodiment of the present disclosure provides a station 06. As shown in FIG. 27, the station 06 includes a sending unit 061, a receiving unit 062, and a processing unit 063.

The sending unit 061 is configured to send a resource allocation request to an access point, where the resource allocation request includes uplink transmission requirement information of the station.

The receiving unit 062 is configured to receive, from the access point, a response frame that carries indication information and that is sent to the station, where the indication information is used to indicate whether the access point delivers a trigger frame to the station in a preset period of time.

The processing unit 063 is configured to switch to an active state when the indication information indicates that the access point delivers the trigger frame to the station in the preset period of time.

The receiving unit 062 is further configured to receive the trigger frame by listening to a channel.

Optionally, the uplink transmission requirement information includes a data amount, a data type, and a service priority of uplink transmission of the station.

This embodiment of the present disclosure provides a station. The station first sends a resource allocation request to an access point before the access point sends a trigger frame, and the resource allocation request includes uplink transmission requirement information of the station. The access point sends, to the station according to the uplink transmission requirement information, a response frame that carries indication information, so as to indicate whether the access point delivers the trigger frame to the station in a preset period of time. Therefore, the station switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 19

Figure 28:
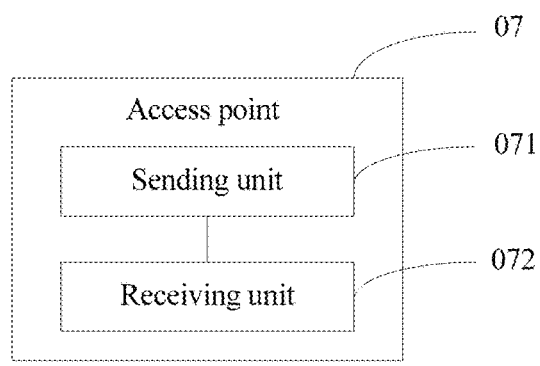
FIG. 28 is a schematic structural diagram of another access point according to an embodiment of the present disclosure.

This embodiment of the present disclosure provides an access point 07. As shown in FIG. 28, the access point 07 includes a sending unit 071 and a receiving unit 072.

The sending unit 071 is configured to send a beacon frame to a station, where the beacon frame includes service identifier mapping information, and the service identifier mapping information is used to indicate whether the station has to-be-receiving downlink data.

The sending unit 071 is further configured to send a trigger frame to stations that have to-be-receiving downlink data and that are in a sleep state.

The receiving unit 072 is configured to receive feedback information from at least one station in the stations that have to-be-receiving downlink data and that are in a sleep state, where the feedback information is used to indicate that the at least one station is in an active state.

The sending unit 071 is further configured to: if the trigger frame sent by the access point fails to trigger all stations in the stations that have to-be-receiving downlink data and that are in a sleep state, send, a trigger frame again to a station that has to-be-receiving downlink data and that is in a sleep state, until all the stations in the stations that have to-be-receiving downlink data and that are in a sleep state are triggered.

Optionally, the beacon frame further includes indication information, and the indication information includes a bitmap or offset information.

Figure 29:
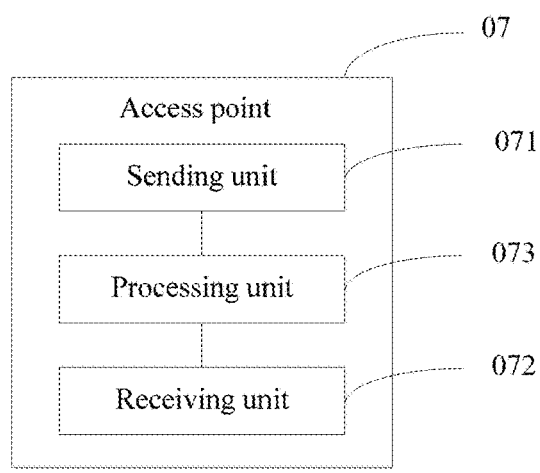
FIG. 29 is a schematic structural diagram of another access point according to an embodiment of the present disclosure.

Optionally, if the indication information is the bitmap, as shown in FIG. 29, the access point further includes a processing unit 073. The processing unit 073 is configured to:

before the beacon frame is sent to the station, determine, from the stations that have to-be-receiving downlink data and that are in a sleep state, a station that is to be triggered and a station that is not to be triggered; and generate the bitmap according to the station that is to be triggered and the station that is not to be triggered, where each bit in the bitmap is corresponding to one station in the stations that have to-be-receiving downlink data and that are in a sleep state, and is used to indicate whether the station is to be triggered.

Optionally, if the indication information is the offset information, the processing unit 073 is configured to:

before the beacon frame is sent to the station, determine from the stations that have to-be-receiving downlink data and that are in a sleep state, a station that is to be triggered and a station that is not to be triggered; and generate the offset information according to the station that is to be triggered and the station that is not to be triggered, where the offset information includes a sub-identifier of a start station and an offset.

Optionally, the feedback information includes a PS-Poll frame, buffer information, or uplink data.

This embodiment of the present disclosure provides an access point. The access point sends, to a station, a beacon frame that carries service identifier mapping information, so as to indicate whether the station has to-be-receiving downlink data. The station switches to an active state if the service identifier mapping information indicates that the station has to-be-receiving downlink data, and receives, by listening to a channel, a trigger frame sent by the access point. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 20

Figure 30:
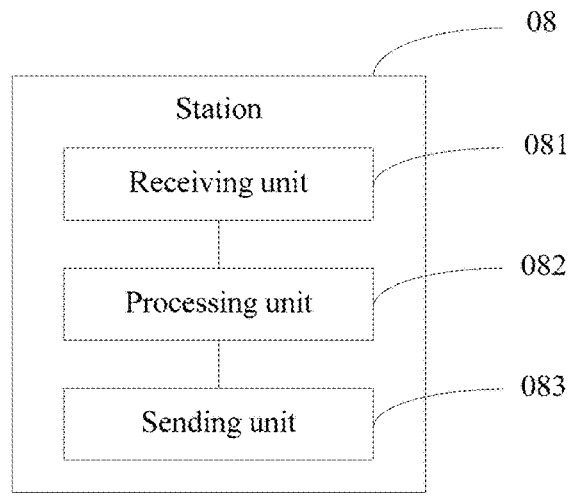
FIG. 30 is a schematic structural diagram of another station according to an embodiment of the present disclosure.

This embodiment of the present disclosure provides a station 08. As shown in FIG. 30, the station 08 includes a receiving unit 081, a processing unit 082, and a sending unit 083.

The receiving unit 081 is configured to receive, from an access point, a beacon frame that carries service identifier mapping information, where the service identifier mapping information is used to indicate whether the station has to-be-receiving downlink data.

The processing unit 082 is further configured to switch, to an active state if the service identifier mapping information indicates that the station has to-be-receiving downlink data.

The receiving unit 081 is further configured to receive, by listening to a channel, a trigger frame sent by the access point.

The sending unit 083 is configured to send feedback information to the access point, where the feedback information is used to indicate that the station is in an active state.

Optionally, the beacon frame further includes indication information, and the indication information includes a bitmap or offset information.

Optionally, if the indication information is the bitmap, the processing unit 082 is specifically configured to:

determine, according to the service identifier mapping information, whether the station has to-be-receiving downlink data;

if the station has to-be-receiving downlink data, determine, according to a bit that is in the bitmap and that is corresponding to the station, whether the station is to be triggered, where each bit in the bitmap is corresponding to one station in the stations that have to-be-receiving downlink data and that are in a sleep state, and is used to indicate whether the station is to be triggered; and switch to an active state if the station is to be triggered.

Optionally, if the indication information is the offset information, the offset information includes a sub-identifier of a start station and an offset, and the processing unit 082 is specifically configured to:

determine, according to the service identifier mapping information, whether the station has to-be-receiving downlink data;

if the station has to-be-receiving downlink data, obtain a sub-identifier of the station according to the service identifier mapping information;

determine, according to the sub-identifier of the start station and the offset, an identifier range of a station that is to be triggered;

determine whether the sub-identifier of the station falls within the identifier range; and switch to an active state if the sub-identifier of the station falls within the identifier range.

Optionally, the feedback information includes a PS-Poll frame, buffer information, or uplink data.

This embodiment of the present disclosure provides a station. An access point sends, to the station, a beacon frame that carries service identifier mapping information, so as to indicate whether the station has to-be-receiving downlink data. The station switches to an active state if the service identifier mapping information indicates that the station has to-be-receiving downlink data, and receives, by listening to a channel, a trigger frame sent by the access point. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 21

Figure 31:
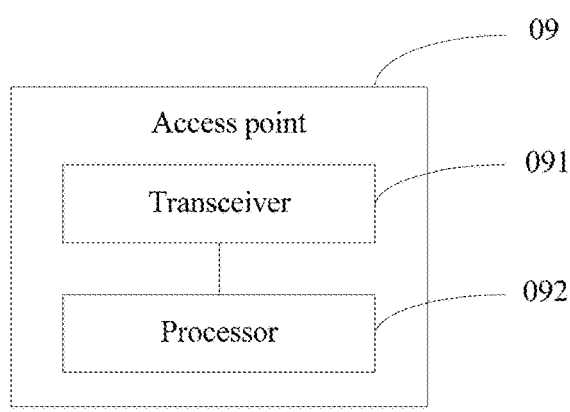
FIG. 31 is a schematic structural diagram of another access point according to an embodiment of the present disclosure.

This embodiment of the present disclosure provides an access point 09. As shown in FIG. 31, the access point 09 includes a transceiver 091 and a processor 092.

The transceiver 091 is configured to send, to a station, a beacon frame that carries a trigger frame information element, where the trigger frame information element includes sending information of a trigger frame, and the sending information of the trigger frame is used by the station to obtain a sending period of the trigger frame.

The processor 092 is configured to obtain a target transmission time sequence of the trigger frame according to the sending period of the trigger frame.

The processor 092 is further configured to contend for a channel when a target transmission time of the trigger frame arrives.

The transceiver 091 is further configured to send the trigger frame to the station after the contention succeeds, where the target transmission time is any time point in the target transmission time sequence.

Optionally, the sending information of the trigger frame is the sending period of the trigger frame or a quantity of sent trigger frames.

Optionally, the trigger frame information element further includes a sending time of a first trigger frame; and the processor 092 is specifically configured to:

obtain the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

Optionally, the trigger frame information element further includes a trigger frame send window size, and the trigger frame send window size is used to indicate an adjustment range of a sending time of the trigger frame; and the processor 092 is specifically configured to:

obtain the target transmission time sequence of the trigger frame according to the trigger frame send window size and the sending period of the trigger frame, where the target transmission time sequence includes:

$t_0+A_0, t_1+A_1, \ldots, t_n+A_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}$, $-U < A_i < U$, and U is the trigger frame send window size.

Optionally, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

Optionally, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

This embodiment of the present disclosure provides an access point. The access point sends, to a station, a beacon frame that carries a trigger frame information element, the trigger frame information element includes sending information of a trigger frame, and the sending information may be a sending period of the trigger frame or a quantity of sent trigger frames. The station obtains a target transmission time sequence of the trigger frame according to the sending information after receiving the beacon frame. The access point contends for a channel when a target transmission time of the trigger frame arrives, and the access point sends the trigger frame to the station after the contention succeeds. In this case, the station switches to an active state, and receives the trigger frame by listening to the channel, and the station performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 22

Figure 32:
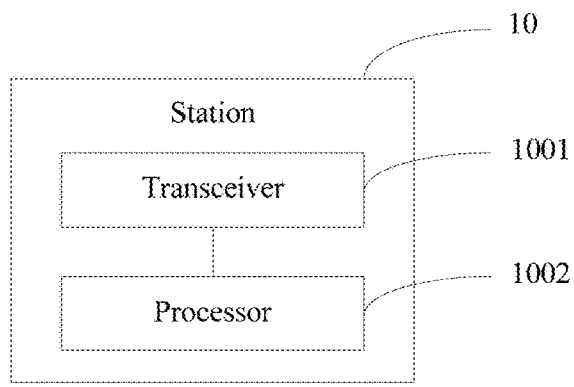
FIG. 32 is a schematic structural diagram of another station according to an embodiment of the present disclosure.

This embodiment of the present disclosure provides a station 10. As shown in FIG. 32, the station 10 includes a transceiver 1001 and a processor 1002.

The transceiver 1001 is configured to receive, from an access point, a beacon frame that carries a trigger frame information element, where the trigger frame information element includes sending information of a trigger frame.

The processor 1002 is configured to obtain a sending period of the trigger frame according to the sending information of the trigger frame.

The processor 1002 is further configured to obtain a target transmission time sequence of the trigger frame according to the sending period of the trigger frame.

The processor 1002 is further configured to switch to an active state when a target transmission time of the trigger frame arrives.

The transceiver 1001 is further configured to receive the trigger frame by listening to a channel, where the target transmission time is any time point in the target transmission time sequence.

The transceiver 1001 is further configured to perform uplink transmission according to indication of the trigger frame.

Optionally, the sending information of the trigger frame is the sending period of the trigger frame or a quantity of sent trigger frames.

Optionally, the trigger frame information element further includes a sending time of a first trigger frame; and the processor 1002 is specifically configured to:

obtain the target transmission time sequence of the trigger frame according to the sending time of the first trigger frame and the sending period of the trigger frame, where the target transmission time sequence includes:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

Optionally, the trigger frame information element further includes a trigger frame send window size, and the trigger frame send window size is used to indicate an adjustment range of a sending time of the trigger frame; and the processor 1002 is specifically configured to:

obtain the target transmission time sequence of the trigger frame according to the trigger frame send window size and the sending period of the trigger frame, where the target transmission time sequence includes:

$t_0-U, t_1-U, \ldots, t_n-U$, where $t_0, t_1, \ldots, t_n$ meet $\forall i, j \in \{1, 2, n\}$, $t_i - t_{i-1} = t_j - t_{j-1} = T$, T is equal to the sending period of the trigger frame, $t_0, t_1, \ldots, t_n$ are a periodic sequence whose period is T, and U is the trigger frame send window size.

Optionally, the trigger frame includes a trigger frame that supports scheduling transmission or a trigger frame that supports random contention transmission; and the sending period of the trigger frame is a sending period of the trigger frame that supports scheduling transmission or a sending period of the trigger frame that supports random contention transmission.

Optionally, the trigger frame includes a trigger frame that supports scheduling transmission or a trigger frame that supports random contention transmission; and the sending period of the trigger frame includes a first sending period and a second sending period, the first sending period is a sending period of the trigger frame that supports scheduling transmission, and the second sending period is a sending period of the trigger frame that supports random contention transmission.

This embodiment of the present disclosure provides a station. The station receives, from an access point, a beacon frame that carries a trigger frame information element, the trigger frame information element includes sending information of a trigger frame, and the sending information may be a sending period of the trigger frame or a quantity of sent trigger frames. The station obtains a target transmission time sequence of the trigger frame according to the sending information after receiving the beacon frame. The access point contends for a channel when a target transmission time of the trigger frame arrives, and the access point sends the trigger frame to the station after the contention succeeds. In this case, the station switches to an active state, and receives the trigger frame by listening to the channel, and the station performs uplink transmission according to indication of the trigger frame after receiving the trigger frame. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 23

Figure 33:
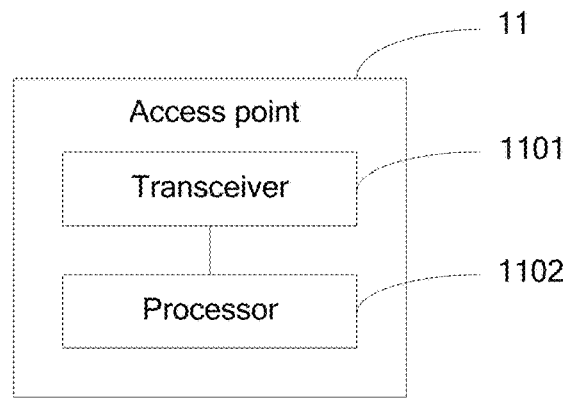
FIG. 33 is a schematic structural diagram of another access point according to an embodiment of the present disclosure.

This embodiment of the present disclosure provides an access point 11. As shown in FIG. 33, the access point 11 includes a transceiver 1101 and a processor 1102.

The processor 1102 is configured to contend for a channel.

The transceiver 1101 is configured to send a trigger frame to a station after the contention succeeds, where the trigger frame carries indication information, and the indication information is used to indicate that when a preset condition is met, the access point delivers another trigger frame to the station in a preset period of time since the station completes uplink transmission.

Optionally, the preset condition includes:

after the station completes uplink transmission, there is another station that needs to be triggered by the access point to perform uplink transmission, or after the station completes uplink transmission, there is another station that has not completed uplink transmission.

This embodiment of the present disclosure provides an access point. The access point adds indication information to a trigger frame that is sent to a station, and the indication information is used to indicate that when a preset condition is met, the access point delivers another trigger frame to the station in a preset period of time since the station completes uplink transmission, so that another station that has not performed uplink transmission or another station that has not completed uplink transmission can complete uplink transmission.

Embodiment 24

Figure 34:
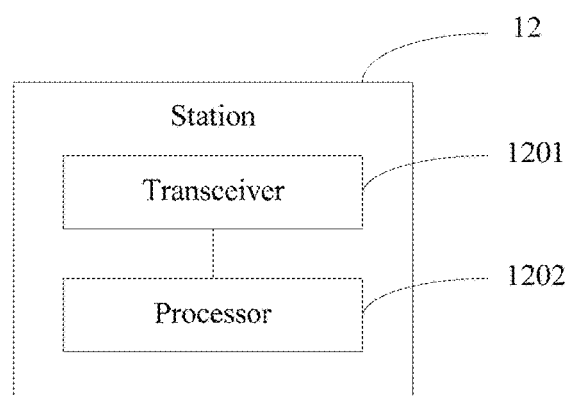
FIG. 34 is a schematic structural diagram of another station according to an embodiment of the present disclosure.

This embodiment of the present disclosure provides a station 12. As shown in FIG. 34, the station 12 includes a transceiver 1201 and a processor 1202.

The transceiver 1201 is configured to receive, by listening to a channel, a trigger frame sent by an access point, where the trigger frame carries indication information, and the indication information is used to indicate that when a preset condition is met, the access point delivers another trigger frame to the station in a preset period of time since the station completes uplink transmission.

The transceiver 1201 is further configured to perform uplink transmission according to indication of the trigger frame.

The processor 1202 is further configured to remain in an active state after uplink transmission is completed according to indication of the indication information.

The transceiver 1201 is further configured to receive the other trigger frame by listening to the channel.

Optionally, the preset condition includes:

after the station completes uplink transmission, there is another station that needs to be triggered by the access point to perform uplink transmission, or after the station completes uplink transmission, there is another station that has not completed uplink transmission.

This embodiment of the present disclosure provides a station. An access point adds indication information to a trigger frame that is sent to the station, and the indication information is used to indicate that when a preset condition is met, the access point delivers another trigger frame to the station in a preset period of time since the station completes uplink transmission, so that another station that has not performed uplink transmission or another station that has not completed uplink transmission can complete uplink transmission.

Embodiment 25

Figure 35:
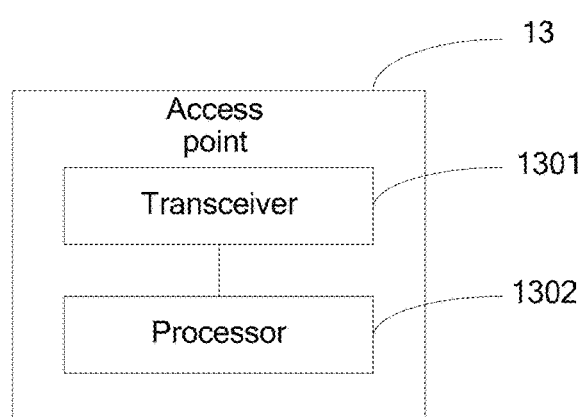
FIG. 35 is a schematic structural diagram of another access point according to an embodiment of the present disclosure.

This embodiment of the present disclosure provides an access point 13. As shown in FIG. 35, the access point 13 includes a transceiver 1301 and a processor 1302.

The transceiver 1301 is configured to receive a resource allocation request sent by a station, where the resource allocation request includes uplink transmission requirement information of the station.

The transceiver 1301 is further configured to send, to the station, a response frame that carries indication information, where the indication information is used to indicate whether the access point delivers a trigger frame to the station in a preset period of time.

The transceiver 1301 is further configured to deliver the trigger frame to the station in the preset period of time.

Optionally, the uplink transmission requirement information includes a data amount, a data type, and a service priority of uplink transmission of the station.

This embodiment of the present disclosure provides an access point. A station first sends a resource allocation request to the access point before the access point sends a trigger frame, and the resource allocation request includes uplink transmission requirement information of the station. The access point sends, to the station according to the uplink transmission requirement information, a response frame that carries indication information, so as to indicate whether the access point delivers the trigger frame to the station in a preset period of time. Therefore, the station switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 26

Figure 36:
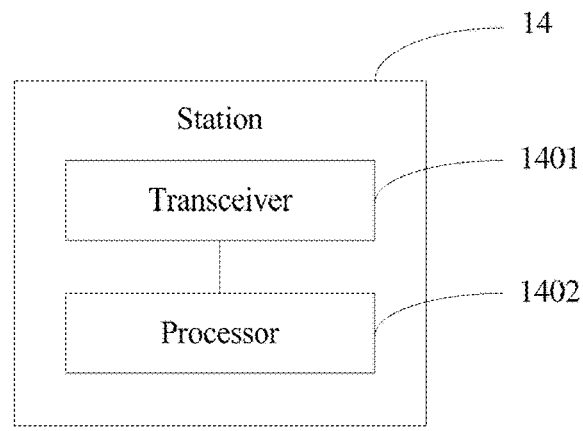
FIG. 36 is a schematic structural diagram of another station according to an embodiment of the present disclosure.

This embodiment of the present disclosure provides a station 14. As shown in FIG. 36, the station 14 includes a transceiver 1401 and a processor 1402.

The transceiver 1401 is configured to send a resource allocation request to an access point, where the resource allocation request includes uplink transmission requirement information of the station.

The transceiver 1401 is further configured to receive, from the access point, a response frame that carries indication information and that is sent to the station, where the indication information is used to indicate whether the access point delivers a trigger frame to the station in a preset period of time.

The processor 1402 is configured to switch to an active state when the indication information indicates that the access point delivers the trigger frame to the station in the preset period of time.

The transceiver 1401 is further configured to receive the trigger frame by listening to a channel.

Optionally, the uplink transmission requirement information includes a data amount, a data type, and a service priority of uplink transmission of the station.

This embodiment of the present disclosure provides a station. The station first sends a resource allocation request to an access point before the access point sends a trigger frame, and the resource allocation request includes uplink transmission requirement information of the station. The access point sends, to the station according to the uplink transmission requirement information, a response frame that carries indication information, so as to indicate whether the access point delivers the trigger frame to the station in a preset period of time. Therefore, the station switches to an active state after receiving the response frame, and receives the trigger frame by listening to a channel. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 27

Figure 37:
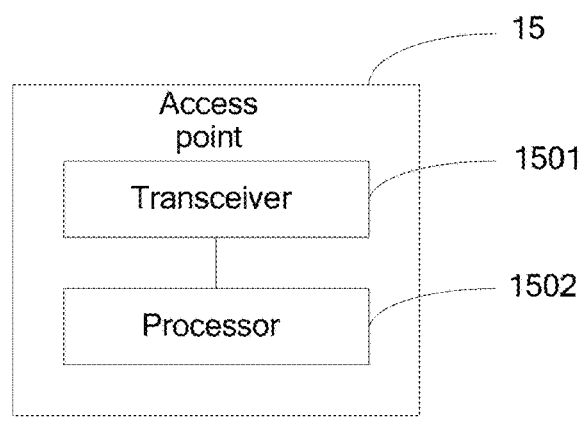
FIG. 37 is a schematic structural diagram of another access point according to an embodiment of the present disclosure.

This embodiment of the present disclosure provides an access point 15. As shown in FIG. 37, the access point 15 includes a transceiver 1501 and a processor 1502.

The transceiver 1501 is configured to send a beacon frame to a station, where the beacon frame includes service identifier mapping information, and the service identifier mapping information is used to indicate whether the station has to-be-receiving downlink data.

The transceiver 1501 is further configured to send a trigger frame to stations that have to-be-receiving downlink data and that are in a sleep state.

The transceiver 1501 is further configured to receive feedback information from at least one station in the stations that have to-be-receiving downlink data and that are in a sleep state, where the feedback information is used to indicate that the at least one station is in an active state.

The transceiver 1501 is further configured to: if the trigger frame sent by the access point fails to trigger all stations in the stations that have to-be-receiving downlink data and that are in a sleep state, send, a trigger frame again to a station that has to-be-receiving downlink data and that is in a sleep state, until all the stations in the stations that have to-be-receiving downlink data and that are in a sleep state are triggered.

Optionally, the beacon frame further includes indication information, and the indication information includes a bitmap or offset information.

Optionally, if the indication information is the bitmap, the processor 1502 is further configured to:

before the beacon frame is sent to the station, determine, from the stations that have to-be-receiving downlink data and that are in a sleep state, a station that is to be triggered and a station that is not to be triggered; and generate the bitmap according to the station that is to be triggered and the station that is not to be triggered, where each bit in the bitmap is corresponding to one station in the stations that have to-be-receiving downlink data and that are in a sleep state, and is used to indicate whether the station is to be triggered.

Optionally, if the indication information is the offset information, the processor 1502 is further configured to:

before the beacon frame is sent to the station, determine, from the stations that have to-be-receiving downlink data and that are in a sleep state, a station that is to be triggered and a station that is not to be triggered; and generate the offset information according to the station that is to be triggered and the station that is not to be triggered, where the offset information includes a sub-identifier of a start station and an offset.

Optionally, the feedback information includes a PS-Poll frame, buffer information, or uplink data.

This embodiment of the present disclosure provides an access point. The access point sends, to a station, a beacon frame that carries service identifier mapping information, so as to indicate whether the station has to-be-receiving downlink data. The station switches to an active state if the service identifier mapping information indicates that the station has to-be-receiving downlink data, and receives, by listening to a channel, a trigger frame sent by the access point. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

Embodiment 28

Figure 38:
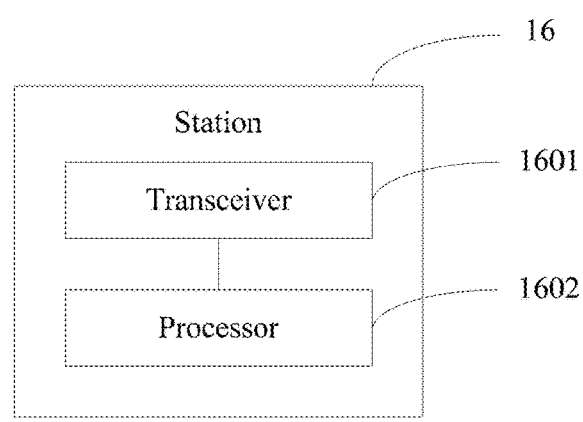
FIG. 38 is a schematic structural diagram of another station according to an embodiment of the present disclosure.

This embodiment of the present disclosure provides a station 16. As shown in FIG. 38, the station 16 includes a transceiver 1601 and a processor 1602.

The transceiver 1601 is configured to receive, from an access point, a beacon frame that carries service identifier mapping information, where the service identifier mapping information is used to indicate whether the station has to-be-receiving downlink data.

The processor 1602 is configured to switch, to an active state if the service identifier mapping information indicates that the station has to-be-receiving downlink data.

The transceiver 1601 is further configured to receive, by listening to a channel, a trigger frame sent by the access point.

The transceiver 1601 is further configured to send feedback information to the access point, where the feedback information is used to indicate that the station is in an active state.

Optionally, the beacon frame further includes indication information, and the indication information includes a bitmap or offset information.

Optionally, if the indication information is the bitmap, the processor 1602 is specifically configured to:

determine, according to the service identifier mapping information, whether the station has to-be-receiving downlink data;

if the station has to-be-receiving downlink data, determine, according to a bit that is in the bitmap and that is corresponding to the station, whether the station is to be triggered, where each bit in the bitmap is corresponding to one station in the stations that have to-be-receiving downlink data and that are in a sleep state, and is used to indicate whether the station is to be triggered; and switch to an active state if the station is to be triggered.

Optionally, if the indication information is the offset information, the offset information includes a sub-identifier of a start station and an offset, and the processor 1602 is specifically configured to:

determine, according to the service identifier mapping information, whether the station has to-be-receiving downlink data;

if the station has to-be-receiving downlink data, obtain a sub-identifier of the station according to the service identifier mapping information;

determine, according to the sub-identifier of the start station and the offset, an identifier range of a station that is to be triggered;

determine whether the sub-identifier of the station falls within the identifier range; and switch to an active state if the sub-identifier of the station falls within the identifier range.

Optionally, the feedback information includes a PS-Poll frame, buffer information, or uplink data.

This embodiment of the present disclosure provides a station. An access point sends, to the station, a beacon frame that carries service identifier mapping information, so as to indicate whether the station has to-be-receiving downlink data. The station switches to an active state if the service identifier mapping information indicates that the station has to-be-receiving downlink data, and receives, by listening to a channel, a trigger frame sent by the access point. It can be learned that there is no need to add information to the trigger frame, thereby reducing signaling overheads, and avoiding impact of a trigger frame failure on a next trigger frame. In this way, when signaling overheads are not increased and reliability is ensured, a station can learn of a sending time of a trigger frame, and the station remains in a receiving state in an appropriate period of time.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present disclosure. The storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

It should be noted that Embodiment 9 described above further includes at least the following implementation manner.

It has mentioned in step 901 of Embodiment 9 that:

an AP sends, to a STA, a beacon frame that carries a trigger frame information element, where the trigger frame information element includes sending information of a trigger frame, and the sending information of the trigger frame is used by the STA to obtain a sending period of the trigger frame.

The sending information may be the sending period of the trigger frame, or may be a quantity of sent trigger frames.

It has mentioned in step 903 that if the sending information is the quantity of sent trigger frames, the sending period of the trigger frame may be obtained by dividing a sending period of the beacon frame by the quantity of sent trigger frames.

In addition, the AP may calculate the sending period of the trigger frame according to another calculation rule by using the quantity of sent trigger frames. The calculation rule includes but is not limited to the following methods.

Method 1: The sending period of the trigger frame may be obtained by dividing, by the quantity of sent trigger frames, a difference obtained by subtracting a sending time of a first trigger frame from a beacon frame interval. A specific calculation formula is as follows:

$$triggerInterval = \frac{beaconInterval - firstTriggerTime}{triggerNum},$$

where triggerInterval is the sending period of the trigger frame, beaconInterval is the sending period of the beacon frame, firstTriggerTime is the sending time of the first trigger frame relative to a previous beacon frame, and triggerNum is the quantity of sent trigger frames.

The sending period of the trigger frame may be in units of time units (Time Unit, TU=1024 μs). If the sending period of the trigger frame that is obtained by calculation by using the foregoing formula is not an integer multiple of a TU, a rounded-down operation may be performed on the sending period to obtain the sending period of the trigger frame.

Method 2:

A beacon frame interval may be divided into two phases: a contention transmission phase and a scheduling transmission phase, duration of the contention transmission phase and duration of the scheduling transmission phase are contentionPhaseTime and schedulingPhaseTime respectively, and a sum of contentionPhaseTime and schedulingPhaseTime is the beacon frame interval.

For a trigger frame that supports contention transmission, a sending period of the trigger frame may be obtained by dividing, by a quantity of sent trigger frames, a difference obtained by subtracting a sending time of a first trigger frame from the duration of the contention transmission phase. A specific calculation formula is as follows:

$$triggerInterval\_R = \frac{contentionPhaseTime - firstTriggerTime}{triggerNum},$$

where triggerInterval_R is the sending period of the trigger frame that supports contention, contentionPhaseTime is the duration of the contention transmission phase, firstTriggerTime is the sending time of the first trigger frame that is relative to a previous beacon frame and that supports contention, and triggerNum is the quantity of the trigger frame that contention transmission.

For a trigger frame that supports scheduling transmission, a sending period of the trigger frame may be obtained by dividing, by a quantity of sent trigger frames, a difference obtained by subtracting a sending time of a first trigger frame from the duration of the scheduling transmission phase. A specific calculation formula is as follows:

$$triggerInterval\_S = \frac{schedulingPhaseTime - firstTriggerTime}{triggerNum},$$

where triggerInterval_S is the sending period of the trigger frame that supports scheduling transmission, schedulingPhaseTime is the duration of the scheduling transmission phase, firstTriggerTime is the sending time of the first trigger frame that is relative to a start point of the scheduling transmission phase and that supports scheduling transmission, and triggerNum is the quantity of the trigger frame that support scheduling transmission.

The sending period of the trigger frame may be in units of time units (Time Unit, TU=1024 μs). If the sending period of the trigger frame that is obtained by calculation by using the foregoing formula is not an integer multiple of a TU, a rounded-down operation may be performed on the sending period to obtain the sending period of the trigger frame.

Furthermore, the sending time of the first trigger frame mentioned in this embodiment may be an absolute time or a relative time. The absolute time refers to a time that uses, as a reference, a system time stored in a node. The relative time refers to a period of time that uses a sending start time or a sending end time of a beacon frame as a start point. Preferably, the relative time may be used.

It should be noted that Embodiment 10 described above further includes at least the following implementation manner.

It has mentioned in step 1107 of Embodiment 10 that the AP may add indication information to the trigger frame, so as to indicate that when a particular preset condition is met, the AP immediately delivers another trigger frame. It has mentioned in step 1110 that the STA remains in an active state after completing uplink transmission according to indication of the indication information, and receives the another trigger frame by listening to the channel.

Herein, it should be emphasized that the indication information may be public indication information specific to all STAs, or may be private indication information specific to each STA triggered by the trigger frame. For the former, the indication information indicates that the AP delivers another trigger frame, and the another trigger frame may trigger all the STAs. For the latter, the indication information specific to each STA indicates that the AP delivers another trigger frame, and the another trigger frame triggers the STA to perform transmission.

If the indication information is the public indication information specific to all the STAs, an implementation procedure of the AP and the STA is the same as that in Embodiment 10 described above.

If the indication information is the private indication information specific to each STA triggered by the trigger frame, in a specific implementation procedure, the original step 1107 in Embodiment 10 is changed to the following step:

Step 1107: The AP sends the trigger frame to the STA after the contention succeeds.

The trigger frame includes the indication information. The indication information is a bitmap field, and the bitmap field is generated according to the STA triggered by the trigger frame. Each STA is corresponding to one bit in the bitmap field. That each bit is 1 indicates that when the preset condition is met, the AP delivers another trigger frame to the STA in a preset period of time since the STA completes uplink transmission.

The indication information is used to indicate that when the preset condition is met, the AP delivers the other trigger frame to the STA in the preset period of time since the STA completes uplink transmission.

The preset condition may include:

after the STA completes uplink transmission, the STA has other to-be-transmitted data.

The preset period of time may be set to a relatively short period of time. That is, when the trigger frame delivered by the AP carries the indication information, it indicates that when the STA meets the preset condition, the AP immediately delivers the other trigger frame.

For example, a process of step 1107 may be shown in FIG. 13. In FIG. 13, T is the sending period of the trigger frame, t is the preset period of time, and BA refers to block acknowledgement. It can be learned that in a normal case, after a trigger frame is sent, the AP delivers a trigger frame again after an interval of T. However, because a trigger frame received this time carries indication information, in a period of time t since completion of uplink transmission, the STA immediately receives another trigger frame sent by the AP.

It should be noted that Embodiment 12 described above further includes at least the following implementation manner.

It has mentioned in Embodiment 12 that the AP may trigger the STA according to indication of service identifier mapping information. In addition, the STA may be triggered in the following manner.

AP side:

Step 1: An AP sends, to a STA, a beacon frame that carries service identifier mapping information, where the service identifier mapping information is used to indicate whether the STA has to-be-receiving downlink data.

Step 2: The AP groups the service identifier mapping information in step 1 according to group information. Each group of service identifier mapping information is corresponding to one group identifier, and therefore, each group of STAs that is mapped to each group of service identifier mapping information is also corresponding to one group identifier. The group information may be generated by the AP and is delivered to the STA, or may be specified by a standard.

Step 3: The AP sends a trigger frame to each group of STAs, that is, the AP adds a group identifier to the sent trigger frame, so as to trigger a STA corresponding to the group identifier to perform uplink transmission.

Step 4: The AP receives feedback information from at least one STA in the STAs that have to-be-receiving downlink data and that are in a sleep state, where the feedback information is used to indicate that the at least one STA is in an active state.

Figures 39, 40:
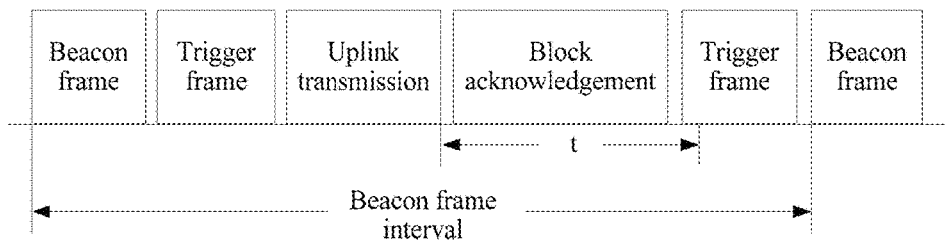
FIG. 39 is a schematic diagram of station grouping according to an embodiment of the present disclosure.
FIG. 40 is a schematic diagram of beacon frame transmission according to an embodiment of the present disclosure.

For step 2, a specific grouping method may be as follows: The AP adds a quantity of STAs in each group to the beacon frame, and a STA calculates a group identifier of the STA according to a location of the STA in the TIM. Specifically, the STA reads the TIM, and obtains a quantity of is in a segment that is in the TIM and in which AIDs are less than an AID of the STA, and an integer part obtained by dividing the quantity of is by a quantity of STAs in each group is a group identifier of the STA. For example, as shown in FIG. 39, if the quantity of STAs in each group is 4, and in the TIM, for a STA whose AID is equal to 16, there are nine STAs with a TIM value 1 preceding the STA whose AID is equal to 16, a group identifier of the STA is [9/4]=2 (rounded-down).

STA side:

Step 1: A STA receives, from an AP, a beacon frame that carries service identifier mapping information, where the service identifier mapping information is used to indicate whether the STA has to-be-receiving downlink data.

Step 2: The STA determines a group identifier of the STA according to group information, where the group information may be generated by the AP and is delivered to the STA, or may be specified by a standard.

Step 3: The STA switches to an active state if the service identifier mapping information indicates that the STA has to-be-receiving downlink data.

Step 4: The STA receives, by listening to a channel, a trigger frame sent by the AP.

Step 5: If the group identifier of the STA matches a group identifier in the trigger frame, the STA sends feedback information to the AP, where the feedback information is used to indicate that the STA is in an active state. A specific sending method may be to randomly select a sub-channel for sending.

It should be noted that the solutions of the present disclosure may further include the following embodiments.

AP side:

Step 1: An AP sends, to a STA, a beacon frame that carries a trigger frame information element, where the trigger frame information element includes sending time information of a first trigger frame.

Step 2: The AP sends a trigger frame to the STA, where the trigger frame carries indication information, so as to indicate whether the AP further delivers a trigger frame before a next beacon frame arrives.

STA side:

Step 1: A STA receives a beacon frame, reads a sending time that is of a first trigger frame and that is included in a trigger frame information element in the beacon frame, and when the first trigger frame arrives, receives a trigger frame sent by an AP.

Step 2: The STA reads indication information in the trigger frame, and if the indication information indicates that the AP does not send a trigger frame before a next beacon frame arrives, the STA may choose to enter a sleep state, and return to an active state when the next beacon frame arrives, so as to receive a beacon frame; or if the indication information indicates that the AP further sends a trigger frame before a next beacon frame arrives, the STA remains in an active state, listens to a channel, receives a next trigger frame, and performs step 2 again.

The indication information is used to indicate that when a preset condition is met, the AP delivers another trigger frame to the STA in a preset period of time since the STA completes uplink transmission.

The preset condition may include:

after the STA completes uplink transmission, there is another STA that needs to be triggered by the AP to perform uplink transmission, or after the STA completes uplink transmission, there is another STA that has not completed uplink transmission.

The preset period of time may be set to a relatively short period of time. That is, when the trigger frame delivered by the AP carries the indication information, it indicates that when the STA meets the preset condition, the AP immediately delivers the other trigger frame.

For example, a process of step 2 may be shown in FIG. 40. In FIG. 40, t is the preset period of time, and BA refers to block acknowledgement. It can be learned that if a trigger frame received this time carries indication information, in a period of time t since completion of uplink transmission, the STA immediately receives another trigger frame sent by the AP. Otherwise, before a next beacon frame arrives, the STA does not receive a trigger frame.

What is claimed is:

1. A method for sending an uplink multi-user transmission trigger frame, the method comprising:

generating, by an access point, a beacon frame carrying a trigger frame information element comprising sending information of a trigger frame for indicating a sending period of the trigger frame;

sending, by the access point, the beacon frame;

obtaining, by the access point, a target transmission time sequence of the trigger frame according to the sending period of the trigger frame;

contending, for a channel when a target transmission time of the trigger frame arrives;

sending the trigger frame to a station after the contention succeeds, where the target transmission time is any time point in the target transmission time sequence;

wherein:

the trigger frame information element further comprises a sending time of a first trigger frame, and obtaining the target transmission time sequence of the trigger frame according to the sending period of the trigger frame comprises:

obtaining the target transmission time sequence of the trigger frame according to the sending time of the first trigger frame and the sending period of the trigger frame, wherein the target transmission time sequence comprises:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

2. The method according to claim 1, wherein the sending information of the trigger frame comprises the sending period of the trigger frame or a quantity of the trigger frame.

3. The method according to claim 1, wherein:

the trigger frame comprises a trigger frame supporting scheduling transmission or random contention transmission; and the sending period of the trigger frame comprising a sending period of the trigger frame supporting scheduling transmission or random contention transmission.

4. The method according to claim 1, wherein:

the trigger frame comprises a trigger frame supporting scheduling transmission or random contention transmission; and the sending period of the trigger frame comprises a first sending period and a second sending period, the first sending period comprises a sending period of the trigger frame supporting scheduling transmission, and the second sending period comprises a sending period of the trigger frame supporting random contention transmission.

5. A method for sending an uplink multi-user transmission trigger frame, the method comprising:

receiving, by a station, a beacon frame carrying a trigger frame information element comprising sending information of a trigger frame for indicating a sending period of the trigger frame;

obtaining, by the station, the sending period of the trigger frame according to the sending information of the trigger frame;

obtaining, by the station, a target transmission time sequence of the trigger frame according to the sending period of the trigger frame;

switching, by the station, to an active state when a target transmission time of the trigger frame arrives;

receiving, by the station, the trigger frame by listening to a channel, wherein the target transmission time is any time point in the target transmission time sequence;

performing, by the station, uplink transmission according to indication of the trigger frame;

wherein:

the trigger frame information element further comprises a sending time of a first trigger frame, and obtaining the target transmission time sequence of the trigger frame according to the sending period of the trigger frame comprises:

obtaining the target transmission time sequence of the trigger frame according to the sending time of the first trigger frame and the sending period of the trigger frame, wherein the target transmission time sequence comprises:

$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame.

6. The method according to claim 5, wherein the sending information of the trigger frame comprises the sending period of the trigger frame or a quantity of sent trigger frames.

7. The method according to claim 5, wherein:

the trigger frame comprises a trigger frame supporting scheduling transmission or random contention transmission; and the sending period of the trigger frame comprises a sending period of the trigger frame supporting scheduling transmission or random contention transmission.

8. The method according to claim 5, wherein:

the trigger frame comprises a trigger frame supporting scheduling transmission or random contention transmission; and the sending period of the trigger frame comprises a first sending period and a second sending period, the first sending period comprising a sending period of the trigger frame supporting scheduling transmission, and the second sending period comprises a sending period of the trigger frame supporting random contention transmission.

9. An apparatus, comprising:

a processor configured to:

generate a beacon frame carrying a trigger frame information element comprising sending information of a trigger frame for indicating a sending period of the trigger frame;

obtain a target transmission time sequence of the trigger frame according to the sending period of the trigger frame;
contend for a channel when a target transmission time of the trigger frame arrives;
wherein:
the trigger frame information element further comprises a sending time of a first trigger frame, and
the processor is configured to obtain the target transmission time sequence of the trigger frame according to the sending time of the first trigger frame and the sending period of the trigger frame, wherein the target transmission time sequence comprises:
$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, and $t_0$ is equal to the sending time of the first trigger frame; and
a transceiver configured to:
send the beacon frame; and
send the trigger frame to the station after the contention succeeds, where the target transmission time is any time point in the target transmission time sequence.

10. The apparatus according to claim 9, wherein the sending information of the trigger frame comprises the sending period of the trigger frame or a quantity of the trigger frame.

11. The apparatus according to claim 9, wherein:
the trigger frame comprises a trigger frame supporting scheduling transmission or random contention transmission; and
the sending period of the trigger frame comprises a sending period of the trigger frame supporting scheduling transmission or random contention transmission; or
the sending period of the trigger frame comprises a first sending period and a second sending period, the first sending period comprising a sending period of the trigger frame supporting scheduling transmission, and the second sending period comprises a sending period of the trigger frame supporting random contention transmission.

12. A method for sending an uplink multi-user transmission trigger frame, the method comprising:
generating, by an access point, a beacon frame carrying a trigger frame information element comprising sending information of a trigger frame for indicating a sending period of the trigger frame;
sending, by the access point, the beacon frame;
obtaining, by the access point, a target transmission time sequence of the trigger frame according to the sending period of the trigger frame;
contending, for a channel when a target transmission time of the trigger frame arrives;
sending the trigger frame to a station after the contention succeeds, where the target transmission time is any time point in the target transmission time sequence;
wherein:
the trigger frame information element further comprises a trigger frame send window size for indicating an adjustment range of a sending time of the trigger frame, and
obtaining the target transmission time sequence of the trigger frame according to the sending period of the trigger frame comprises:

obtaining the target transmission time sequence of the trigger frame according to the trigger frame send window size and the sending period of the trigger frame, wherein the target transmission time sequence comprises:
$t_0, t_1, \ldots, t_n$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}$, $-U < A_i < U$, and U is the trigger frame send window size, and where $A_0, A_1, \ldots, A_n$ are determined by the access point.

13. A method for sending an uplink multi-user transmission trigger frame, the method comprising:
receiving, by a station, a beacon frame carrying a trigger frame information element comprising sending information of a trigger frame for indicating a sending period of the trigger frame;
obtaining, by the station, the sending period of the trigger frame according to the sending information of the trigger frame;
obtaining, by the station, a target transmission time sequence of the trigger frame according to the sending period of the trigger frame;
switching, by the station, to an active state when a target transmission time of the trigger frame arrives;
receiving, by the station, the trigger frame by listening to a channel, wherein the target transmission time is any time point in the target transmission time sequence;
performing, by the station, uplink transmission according to indication of the trigger frame;
wherein:
the trigger frame information element further comprises a trigger frame send window size for indicating an adjustment range of a sending time of the trigger frame, and
obtaining the target transmission time sequence of the trigger frame according to the sending period of the trigger frame comprises:
obtaining the target transmission time sequence of the trigger frame according to the trigger frame send window size and the sending period of the trigger frame, wherein the target transmission time sequence comprises:
$t_0 - U, t_1 - U, \ldots, t_n - U$, where $t_0, t_1, \ldots, t_n$ meet $\forall i, j \in \{1, 2, \ldots, n\}$, $t_i - t_{i-1} = t_j - t_{j-1} = T$, T is equal to the sending period of the trigger frame, $t_0, t_1, \ldots, t_n$ are a periodic sequence whose period is T, and U is the trigger frame send window size.

14. An apparatus, comprising:
a processor configured to:
generate a beacon frame carrying a trigger frame information element comprising sending information of a trigger frame for indicating a sending period of the trigger frame;
obtain a target transmission time sequence of the trigger frame according to the sending period of the trigger frame;
contend for a channel when a target transmission time of the trigger frame arrives;
wherein the trigger frame information element further comprises a trigger frame send window size for indicating an adjustment range of a sending time of the trigger frame; and
obtain the target transmission time sequence of the trigger frame according to the trigger frame send window size and the sending period of the trigger frame, wherein the target transmission time sequence comprises:

$t_0+A_0, t_1+A_1, \ldots, t_n+A_n$, where $t_0, t_1, \ldots, t_n$ meet $\forall i, j \in \{1, 2, \ldots, n\}$, $t_i-t_{i-1}=t_j-t_{j-1}=T$, T is equal to the sending period of the trigger frame, $t_0, t_1, \ldots, t_n$ are a periodic sequence whose period is T, $A_0, A_1, \ldots, A_n$ meet $\forall i \in \{1, 2, \ldots, n\}$, $-U<A_i<U$, and U is the trigger frame send window size, and where $A_0, A_1, \ldots, A_n$, are determined by the apparatus, and, a transceiver configured to:
  send the beacon frame; and
  send the trigger frame to the station after the contention succeeds, where the target transmission time is any time point in the target transmission time sequence.

* * * * *